US011830330B1

(12) United States Patent
Island et al.

(10) Patent No.: US 11,830,330 B1
(45) Date of Patent: Nov. 28, 2023

(54) SYSTEMS AND METHODS FOR STORING, MANAGING, AND DISPENSING ITEMS AND GOODS FROM MULTI USER KIOSK

(71) Applicant: GreenSTOP Inc., Torrance, CA (US)

(72) Inventors: Timothy Island, San Diego, CA (US); James William Edwards, Torrance, CA (US)

(73) Assignee: GreenSTOP Inc., Torrance, CA (US)

( * ) Notice: Subject to any disclaimer, the term of this patent is extended or adjusted under 35 U.S.C. 154(b) by 253 days.

(21) Appl. No.: 17/356,490

(22) Filed: Jun. 23, 2021

Related U.S. Application Data

(63) Continuation-in-part of application No. 16/015,216, filed on Jun. 22, 2018, now abandoned.

(60) Provisional application No. 62/523,776, filed on Jun. 23, 2017.

(51) Int. Cl.

*G07F 9/02* (2006.01)
*G06Q 20/18* (2012.01)
*G07F 11/24* (2006.01)
*G07F 9/00* (2006.01)

(52) U.S. Cl.

CPC ........... *G07F 9/0235* (2020.05); *G06Q 20/18* (2013.01); *G07F 9/009* (2020.05); *G07F 11/24* (2013.01)

(58) Field of Classification Search

CPC ........ G07F 9/023; G07F 9/006; G07F 9/0235; G07F 9/009; G07F 11/24; G06Q 20/327; G06Q 20/18

See application file for complete search history.

(56) References Cited

U.S. PATENT DOCUMENTS 5,042,686 A * 8/1991 Stucki ..................... G07F 11/54 194/906
5,273,183 A 12/1993 Tuttobene
8,214,078 B1 * 7/2012 Sta. Cruz ............. G07F 11/165 700/242
8,463,432 B2 6/2013 Weinshenker
2002/0046122 A1 * 4/2002 Barber .................. G06Q 30/04 705/17

(Continued)

OTHER PUBLICATIONS

Advisory Action, "Advisory Action dated Aug. 18, 2020," U.S. Appl. No. 16/015,216, 2 Pages.

(Continued)

*Primary Examiner* — Michael Collins
(74) *Attorney, Agent, or Firm* — HIPP LAW

(57) ABSTRACT

Approaches are described for storing, managing, and dispensing products from automated multi-user kiosks. For example, a multi-user kiosk may include interface sides alternating with non-interface panels including at least one storage door for loading products. Products are stored in a shared storage within the kiosk. The shared storage may be a plurality of carousels stacked as a single column Each carousel can rotate independently of each other. Users are verified and authorized prior to purchasing products or accessing storage for loading products. A first carousel containing a first product may be rotated in a first direction to dispense the first product to a first user at a first side of the kiosk at substantially a same time as a second carousel containing a second product rotates in a second direction to dispense the second product to a second user at a second side of the kiosk.

14 Claims, 14 Drawing Sheets

600 603 115 114 116 101 117 610 638 637 608 626 606 624 636 634 635 604 622 620 633 602 630 632 113 110 112 111

(56) References Cited

U.S. PATENT DOCUMENTS

| | | | | |
|---|---|---|---|---|
| 2004/0254676 | A1* | 12/2004 | Blust | G06Q 10/087 700/231 |
| 2007/0252003 | A1 | 11/2007 | Goldring et al. | |
| 2008/0128444 | A1* | 6/2008 | Schininger | G07F 11/54 221/12 |
| 2009/0143906 | A1 | 6/2009 | Blust et al. | |
| 2011/0153071 | A1 | 6/2011 | Claessen | |
| 2011/0160901 | A1 | 6/2011 | Abrams, Jr. et al. | |
| 2012/0109369 | A1* | 5/2012 | Paluga | G07F 11/48 700/232 |
| 2019/0392667 | A1* | 12/2019 | Naaman | G07F 17/0042 |
| 2020/0234263 | A1* | 7/2020 | Wang | G07F 9/002 |

OTHER PUBLICATIONS

Office Action, "final Office Action dated Jun. 10, 2020," U.S. Appl. No. 16/015,216, 11 pages.

Office Action, "Non-final Office Action dated Nov. 19, 2019," U.S. Appl. No. 16/015,216, 5 pages.

Office Action, "Non-final Office Action dated Dec. 24, 2020," U.S. Appl. No. 16/015,216, 8 pages.

* cited by examiner

SYSTEMS AND METHODS FOR STORING, MANAGING, AND DISPENSING ITEMS AND GOODS FROM MULTI USER KIOSK

CROSS REFERENCE TO RELATED APPLICATIONS

The present application is a continuation-in-part of U.S. nonprovisional patent application Ser. No. 16/015,216, filed Jun. 22, 2018, and entitled "SYSTEMS AND METHODS FOR STORING, MANAGING, AND DISPENSING ITEMS AND GOODS FROM MULTI USER KIOSK", which claims priority to U.S. provisional application No. 62/523,776, filed Jun. 23, 2017, and entitled "METHODS FOR STORING, MANAGING, AND DISPENSING ITEMS AND GOODS FROM MULTI USER KIOSK", which are hereby incorporated herein in their entireties for all purposes.

BACKGROUND

When servicing multiple customers at a vending type machine, such as an automated kiosk, Automated Teller Machine (ATM), and the like, a queue for conducting a transaction (e.g., selecting and purchasing items from the kiosk) and dispensing items typically develops, oftentimes causing customers to experience longer wait times to complete their transactions. Conventional vending machines include a single side for interfacing with the customer, and is only able to service one customer at a time. Thus, if multiple customers arrive at the vending machine, the customers must wait in line for their turn, resulting in longer service queues which slow down businesses. Even if an array of single-sided vending machines is provided to service multiple customers simultaneously, acquiring and managing multiple machines incurs expensive equipment costs, maintenance costs, and real estate costs.

Some conventional vending machines may have multiple user interface sides to service multiple customers, but nonetheless encounter long customer wait times due to limited availability of products and/or access to the products. For example, if a customer is purchasing a product on one side of the vending machine, but that side runs out of the product, the customer must move to another side of the vending machine. There may also be no guarantee whether the product is still available at other sides of the machine. Not only does the customer have to wait longer to complete his purchase, this additional wait time for the customer has further delayed the wait times of subsequent customers in line behind him.

Further, if a multi-user vending machine has a shared storage of products, and two users at different sides purchase the same product, one customer must wait his turn to receive the product, after the vending machine dispenses the product to the other customer first. A shared storage for a multi-user vending machine also experiences quicker depletion of product inventory as multiple users order and withdraw products (and/or order the same products) from the same machine, which requires making the machine unavailable for customers more frequently in order to maintain and restock the storage.

Additionally, as new products arrive to the market, more steps may be required for a customer to access the product at a vending machine. For example, a new product may require regulated under the Food and Drug Administration (FDA), or other governmental regulations. Purchase of a product may require a prescription, license or permit, age restrictions (e.g., 18 years or older, 21 years or older, etc.), subscription or membership fees, and so forth. Such additional verification and authorization steps add to longer wait times for servicing customers at the vending machine, resulting in longer service queues and slower businesses. Accordingly, it is desirable to provide improved techniques for speeding up throughput of transactions and dispensing items when servicing customers at an automated vending machine.

BRIEF DESCRIPTION OF THE DRAWINGS

Various embodiments in accordance with the present disclosure will be described with reference to the drawings, in which.

DETAILED DESCRIPTION

Figure 1A:
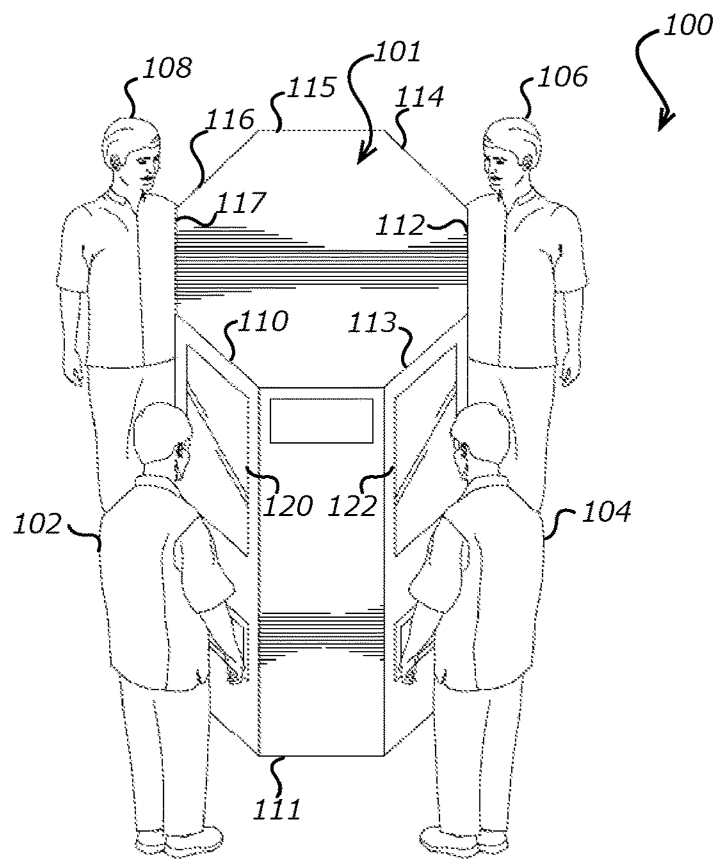
FIGS. 1A and 1B illustrate examples in which multiple users are serviced by a multi-user kiosk simultaneously in accordance with various embodiments.

Systems and methods in accordance with the embodiments described herein overcome various deficiencies in existing approaches to storing, managing, and dispensing products from kiosks. In particular, various embodiments describe methods, services, systems, and apparatuses for storing, managing, and dispensing products in multi-user kiosks having multiple sides that is modular and scalable for servicing multiple customers at substantially a same time.

In an embodiment, a multi-user kiosk has eight sides (e.g., shaped is as an octagonal prism), with four interface sides (e.g., sides with input interfaces, such as a touchscreen, for interfacing with users and with a corresponding payment terminal and dispenser port) alternating between four non-interface panels (e.g., sides without input interface that provide privacy space between users and/or include a storage door to access a shared storage within the kiosk). In an embodiment, products in the kiosk are stored in a shared storage, where the shared storage includes a plurality of stacked carousels that rotate about a vertical axis. Additionally or alternatively, the plurality of stacked carousels rotate about one or more horizontal axes. The carousels can rotate in clockwise and counter-clockwise positions independent of each other. In certain embodiments, the carousels can rotate around an horizontal axis independent of each other. Each carousel has a plurality of trays that revolve with the carousel. Each tray includes an array of slots, with each slot being able to store a predetermined quantity of a product. Each slot can have a helical feeder coil to space out the units of each product. When carousels are rotated such that their trays face an interface side of the kiosk (e.g., rotated to a dispensing position), the helical feeder coil may rotate about a horizontal axis to push the product out of the tray and deposit the product into a dispenser port to a user at the interface side. When carousels are rotated to face their trays to a non-interface panel with a storage door (e.g., rotated to a loading position), the trays behind the storage door may be accessible to an authorized user (e.g., admin, staff, employee, etc.) to restock the storage with more products.

Advantageously, embodiments described herein provide for dispensing products to a plurality of users from a single kiosk at substantially the same time. In an example, a first user may be located at a first interface side of a kiosk, while a second user is located at a second interface side of the kiosk. The kiosk may verify the identity of both users and confirm that the users are authorized to purchase products from the kiosk. The first user purchases a first product located in a first carousel and the second user purchases a second product located in a second carousel (e.g., the second carousel is stacked on top of the first carousel in the kiosk and can rotate independently of the first carousel). A minimal number of turns is determined for rotating each product to the appropriate user. The first carousel can be rotated by a first number of turns in a first direction to dispense the first product to the first user, while the second carousel is rotated by a second number of turns in a second direction to dispense the second product to the second user. In an example, the first carousel may be rotated two turns clockwise to move the first product to the first user, and at the same time, the second carousel may be rotated three turns counter-clockwise to move the second product to the second user, thus dispensing the products to each user at different sides of the kiosk at substantially the same time.

Various other functions and advantages are described and suggested below as may be provided in accordance with the various embodiments.

FIG. 1A illustrates an example 100 of a multi-user kiosk 101 in an example situation where multiple users 102, 104, 106, and 108 simultaneously interact with and access the multi-user kiosk 101 system. In the embodiment, kiosk 101 is in the shape of an octagonal prism, having eight sides of equal width. In the example, the multi-user kiosk 101 includes interface sides 110, 112, 114, and 116, each of which includes an input interface (e.g., 120, 122, also referred to as an interface display) to interface with users 102, 104, 106, and 108, respectively. Non-interface panels 111, 113, 115, and 117 disposed between each interface side provide a space between each user 102, 104, 106, and 108 to ensure privacy of each user's interaction with the kiosk 101.

Prior to a transaction, the system verifies the identity of each user and checks whether the user has authorization to access the items (also referred to as products) within the kiosk 101. For example, a camera (not shown) affixed or attached to the top of the kiosk 101 on interface side 110 can capture facial images of user 102 and compare the captured images with an image database (e.g., a government database of personal records) to confirm the identity (e.g., first and last name, address, etc.) of user 102 through facial recognition techniques known in the art. Input interface 120 prompts user 102 to enter credentials or provide documentation (e.g., driver's license, doctor's prescription, etc.) to check whether user 102 meets authorization (e.g., accessibility) requirements. For example, the sale of some products may require a prescription issued within a predetermined time period, a government issued permit, an age threshold (e.g., over the age of 18 or 21), etc. Meanwhile, user 104 can be verified by a second camera (not shown) affixed to the top of the kiosk 101 on interface side 112 and authorized by input interface 122, allowing both user 102 and user 104 to be serviced by the same kiosk 101 at the same time.

In an embodiment, products available to be purchased from the kiosk 101 are stored in a shared storage (not shown) within a cavity inside the kiosk 101 housing. For example, the shared storage can include trays of slots (e.g., a preconfigured quantity of one type of product per slot, for example, 10 units of product A are queued within a first slot, 5 units of product B are queued within a second slot, etc.), each tray facing behind an interface side 110, 112, 114, and 116. The trays are arranged around and supported by a carousel (not shown) within the kiosk 101 housing. The slots can be arranged in rows and columns. As will be described further herein, in an embodiment, columns of slots across each row of a plurality of slots rotates about a horizontal axis to vertically reposition the plurality of items stored in the column of slots.

In the example, user 102 interacts with kiosk 101 through input interface 120 to browse and select items for purchase. User 104 also interacts with kiosk 101, but through input interface 122 and browses and select items for purchase. Prior to dispensing, the items (e.g., as stored in the carousel) purchased by a user may be located at (e.g., positioned directly behind) a different side of the kiosk 101 from the user. For example, user 102 is located at interface side 110 and purchases product A. However, the carousel slot in which product A is currently stored is located behind interface side 114. Therefore, the carousel will rotate (e.g., about a vertical axis) until product A is positioned to interface side 110, to be dispensed directly in front of user 102. Meanwhile, user 104 is located at side 112 and purchases product B, which is stored in a second carousel. However, the carousel slot in which product B is currently stored is located behind side 116. Therefore, the carousel will rotate until product B is positioned to side 112, to be dispensed directly in front of user 104.

In another embodiment, items available to be purchased from the kiosk 101 are stored within slots inside a plurality of carousels (not shown) which are stacked upon one another within the housing of the kiosk 101. In this example, user 102 and user 104 both purchase product A from the same kiosk 101 at the same time. Product A is stored in both carousels in slots behind side 115, for example 5 units of product A have been loaded into a slot (e.g., behind side 115) in a first carousel, and another 5 units of product A have been loaded into another slot (e.g., also behind side 115) in a second carousel. The first carousel will rotate counter-clockwise (e.g., about a vertical axis) until product A is positioned to side 110, to be dispensed directly in front of user 102. At the same time, the second carousel will rotate clockwise until product A is positioned to side 112, to be dispensed directly in front of user 104. Thus, the kiosk will rotate the plurality of carousels by a minimal number of degrees to position the purchased products to the side at where their respective users are located. This allows users 102 and 104 to purchase and receive the same product at the same kiosk at the same time, without having to wait for the other user to receive the product first. The carousels are described in further detail in FIGS. 5A, 5B, and 6.

Figure 1B:
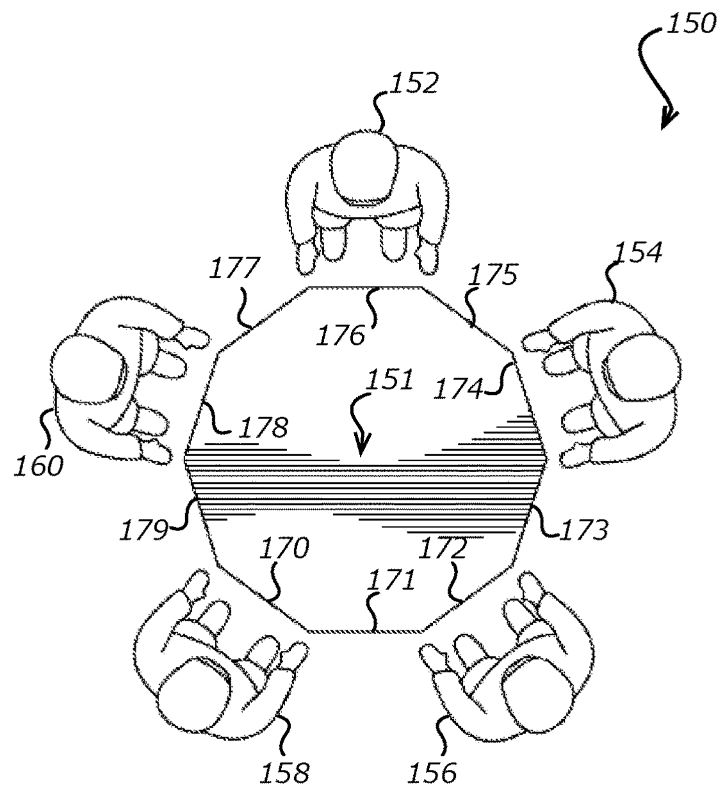

FIG. 1B illustrates example 150 of another embodiment of a multi-user kiosk 151. In the example, multi-user kiosk 151 is in the shape of a decagonal prism, having ten sides of equal width and servicing five users 158, 156, 154, 152, and 160 simultaneously. In the example, the multi-user kiosk 151 includes interface sides 170, 172, 174, 176, and 178, each of which includes an input interface (not shown) to interface with users 158, 156, 154, 152, and 160, respectively. Non-interface panels 171, 173, 175, 177, and 179 are disposed between each interface side provide a space between each user 158, 156, 154, 152, and 160 to ensure privacy of each user's interaction with the kiosk 151.

In another embodiment, kiosk 151 can be in the shape of other polygonal prisms (e.g., having nine sides, ten, eleven, etc.). For example, a kiosk could be in the shape of a hexagonal prism, with three sides having interface sides, and a non-interface panel in between each interface side to provide space and privacy for users. In yet another embodiment, other ratios of the number of interface sides to non-interface panels may be used and/or the sides may be of varying widths. For example, in a kiosk having the shape of a pentagonal prism, all five sides may have an input interface. The five sides may be large in width (e.g., at least twice the width of an average person, etc.) in order to space users per side as far enough apart from each other as to provide space and privacy in their kiosk transactions.

Figure 2:
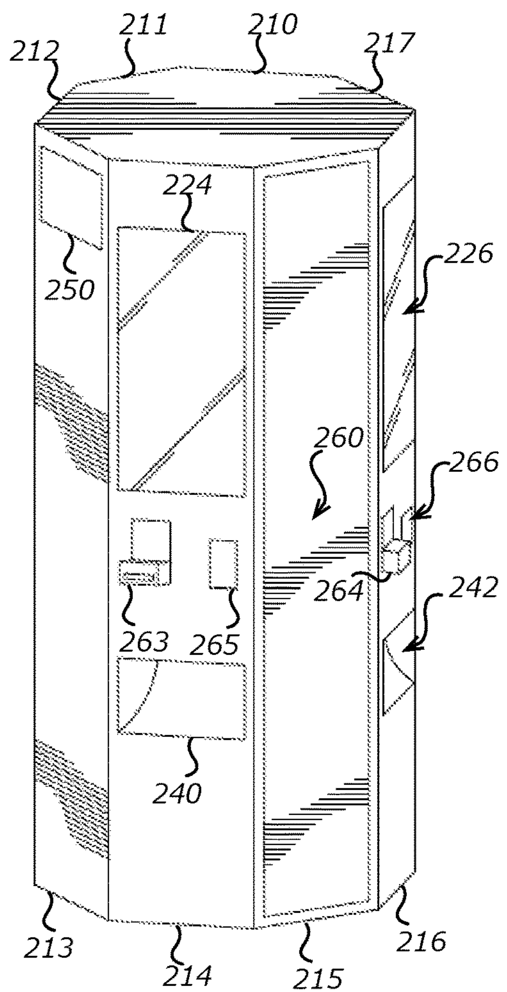
FIG. 2 illustrates a perspective view of an example multi-user kiosk in accordance with various embodiments.

FIG. 2 illustrates a perspective view of example multi-user kiosk 200. It should be understood that reference numbers are carried over between figures for similar components for purposes of simplicity of explanation, but such usage should not be construed as a limitation on the various embodiments unless otherwise stated. As described, the multi-user kiosk system can include a cabinet having a base, a ceiling, a front wall, a rear wall, and side walls, the front wall, the rear wall, and the side walls disposed in vertical planes with respect to the base and the ceiling, the base, the ceiling, the front wall, the rear wall, and the side walls defining a three-dimensional space that includes a shared plurality of carousels within the cabinet for storing a plurality of items to be dispensed, individual carousels of the shared plurality of carousels operable to rotate about a vertical axis and being stacked as a single column disposed substantially in a middle portion of the three-dimensional space.

In the example, the kiosk includes panels 210, 211, 212, 213, 214, 215, 216, and 217. In an embodiment, at least one non-interface panel 215 includes an inventory replacement door 260 (also referred to as a storage door) that allows for access to the products stored inside kiosk 200 and updating the kiosk's 200 inventory management system. A frame 250 allows for installation of a window (e.g., glass pane, mesh screen, etc.) for viewing of inventory items inside the kiosk 200, such as for system maintenance purposes. In an embodiment, door 260 remains locked and is restricted to users unless a user is given authorization (e.g., a user is designated as admin, such as an employee, store manager, etc.), such as for inventory management and system maintenance.

In an example, most users are customers and are designated as an admin, and thus are prohibited access from door 260. Therefore, when the user approaches the kiosk 200, he may only interact with one side of the kiosk 200, such as interface side 214 or 216. In this example, a first user (e.g., a first customer) can approach interface side 214, while a second user (e.g., a second customer) approaches interface side 216. The first user interacts with input interface 224, which prompts the first user to provide (e.g., scan) his identification (for example, a driver's license) and authorization documents (for example, driver's license confirming age, a prescription, permits, employee badge, etc.) at scanner 263. The first user scans his driver's license and prescription accordingly. The second user interacts with input interface 226, which prompts the second user to do the same at scanner 264, and the second user scans his driver's license and prescription. The system verifies the identities of both users (e.g., confirms that the users' identities, such as name and address, match the information in government personal records). The system proceeds to determine the authorization levels (e.g., no access, access to purchase, or access to storage) of both users at the same time. In this example, because the users are over 18 years of age (as provided by their driver's licenses) and have a valid prescription, but do not have an employee badge, the system authorizes the two users to purchase only, but not access storage (e.g., the two users are not authorized to unlock door 260). Thus, input interface 224 and 226 proceed to guide the first user and second user, respectively, to retail pages to browse and select items for purchase. When the users have selected their products for purchase, input interface 224 and 226 prompt the first and second user, respectively, to provide payment through payment terminal 265 and 266, respectively. The users' purchased items are then dispensed at substantially the same time to the users at their respective dispenser port 240 and 242.

In another example, a user with administrative authority (e.g., authorized to access kiosk storage) may approach an interface side 214 or 216, and the side's corresponding input interface 224 or 226, respectively, can prompt the admin to scan his identification (e.g., driver's license, passport, etc.) and authorization documents (e.g., driver's license, employee badge, maintenance permit, membership card, etc.). Input interface 224 or 226 may confirm that the admin is authorized to access inside the kiosk 200 (e.g., by checking admin's driver's license, an employees list, list of authorized maintenance workers, etc.). Once authorized, the admin is permitted to view and/or edit restricted pages (e.g., inventory pages, system maintenance pages, etc.) on input interface 224 or 226 and door 260 unlocks to allow access to the storage (e.g., carousels). In the example, the admin can use any input interface 224, 226 on the kiosk 200 in order to unlock door 260, so long as the input interface 224, 226 verifies and authorizes storage access for the admin.

In another embodiment, kiosk 200 can include additional doors for storage access from other sides, for example, on non-interface panel 213. Each door can be preconfigured to be unlocked by a particular input interface or all input interfaces. For example, door 260 may be preconfigured to be unlocked only if an admin interacts with (and is verified and authorized by) input interface 226 on interface side 216, while a second door on non-interface panel 213 may be preconfigured to be unlocked only if the admin interacts with (and is verified and authorized by) input interface 224 on interface side 214. Having additional doors also allows multiple admins to simultaneously access and replenish the kiosk storage from different sides of the kiosk.

In an example, once door 260 is unlocked, the admin loads new products and/or restocks products in the carousel (not shown) within kiosk 200. Sensors such as weight sensors, RFID readers, and the like, can be used to identify the newly loaded products, the quantity of each product loaded, the position of the products (e.g., which carousel slot and facing behind which side of the kiosk 200), etc. The system updates the inventory status of the kiosk 200 accordingly. The sensors may also be located within dispenser ports 240, 242 to identify and confirm the completion of a sale (e.g., sensors detect a product has been successfully deposited into dispenser port 240, 242 such that the product becomes available to be immediately redeemed by a user), and to update the inventory status accordingly. After product loading, the system rotates the carousel such that products will be located at a preconfigured position within kiosk 200 relative to the interface sides 210, 212, 214, 216. For example, a configuration file may include a default inventory arrangement, where product A should be positioned behind side 214, product B should be positioned behind side 216, etc.

Figure 3:
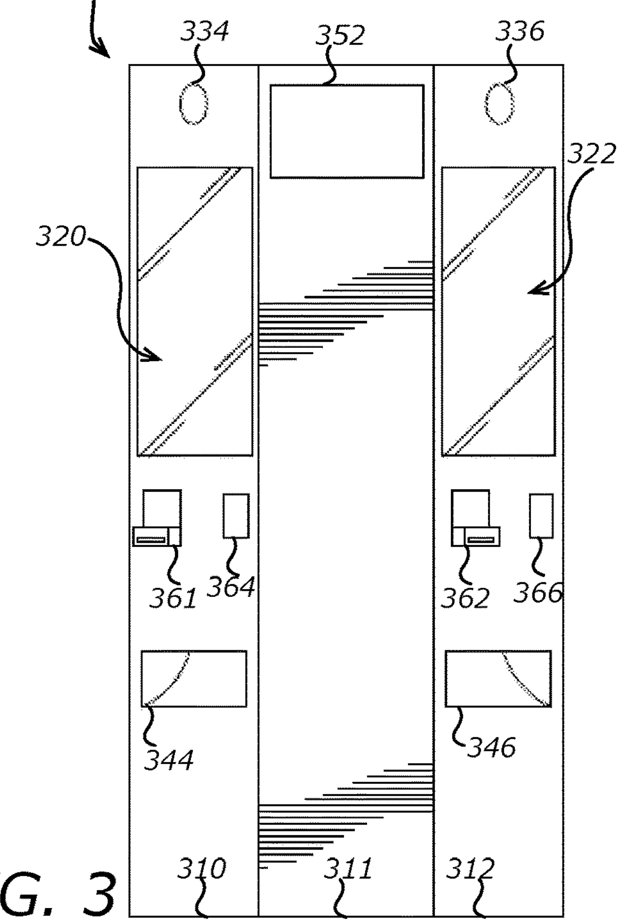
FIG. 3 illustrates an elevated view of an example multi-user kiosk in accordance with various embodiments.

FIG. 3 illustrates an elevated view of example multi-user kiosk 300 in accordance with various embodiments. In the example, interface side 310 includes a corresponding camera 334, input interface 320, scanner 361, payment terminal 364, and dispenser port 344. Interface side 312 includes a corresponding camera 336, input interface 322, scanner 362, payment terminal 366, and dispenser port 346. Non-interface side 311 includes a frame that allows for installation of a window (e.g., glass pane, mesh screen, etc.) 352 for viewing of inventory items inside the kiosk 300, such as for system maintenance purposes. In another embodiment, non-interface side 311 may be fitted with signage, a circuit breaker box, etc.

In the example, a first user at side 310 may interact with kiosk 300 through input interface 320 to browse, select, and purchase products. Camera 334 scans facial features of the first user to determine his identity (e.g., by checking against a governmental personal records database, and the like). Input interface 320 prompts the first user to provide his credentials (e.g., driver's license, membership card, prescription, state issued permit, etc.) to be read at scanner 361 and authorizes the first user (e.g., confirms whether he is over an age threshold, holds a valid prescription, license, or permit, has administrative access, etc., to be eligible to purchase products or access storage within kiosk 300). In another embodiment, cameras 334, 336 can perform both verification and authentication steps simultaneously, for example, by scanning a user's facial features to verify the user's identity and to check against a photographic database of authorized users. The first user browses and selects products through interface 320, and provides payment via payment terminal 364 (e.g., scans or inserts credit card, inserts cash, etc.).

Meanwhile, a second user at interface side 312 may interact with kiosk 300 through input interface 322 to browse, select, and purchase products. Camera 336 scans facial features of the second user to verify her identity. Input interface 322 prompts the second user to provide her credentials (e.g., driver's license, membership card, prescription, state issued permit, etc.) to be read at scanner 362 and determines authorization of the second user (e.g., confirms whether she is over an age threshold, holds a valid prescription, license, or permit, etc., to be eligible to purchase products or access storage within kiosk 300). The second user browses and selects products through interface 322, and provides payment via payment terminal 366.

In an embodiment, products purchased by the users are stored in various locations (e.g., slots) among the plurality of vertically stacked carousels within kiosk 300. The position of the products may be predetermined by settings in a configuration file (e.g., products are arranged alphabetically by name, chronologically by expiration date, etc.) or arranged manually. In another example, the current position of the products may be the result of rotating the carousels to execute previous purchases from prior users. Upon payment by the users, the carousels rotate (e.g., clockwise or counterclockwise about a vertical axis) using a minimum number of turns to position the purchased products behind the appropriate interface side 310, 312, and deposit the purchased products into dispenser ports 344, 346, respectively, such that the first user and second user redeem their purchases at substantially the same time from the same kiosk 300.

Figure 4:
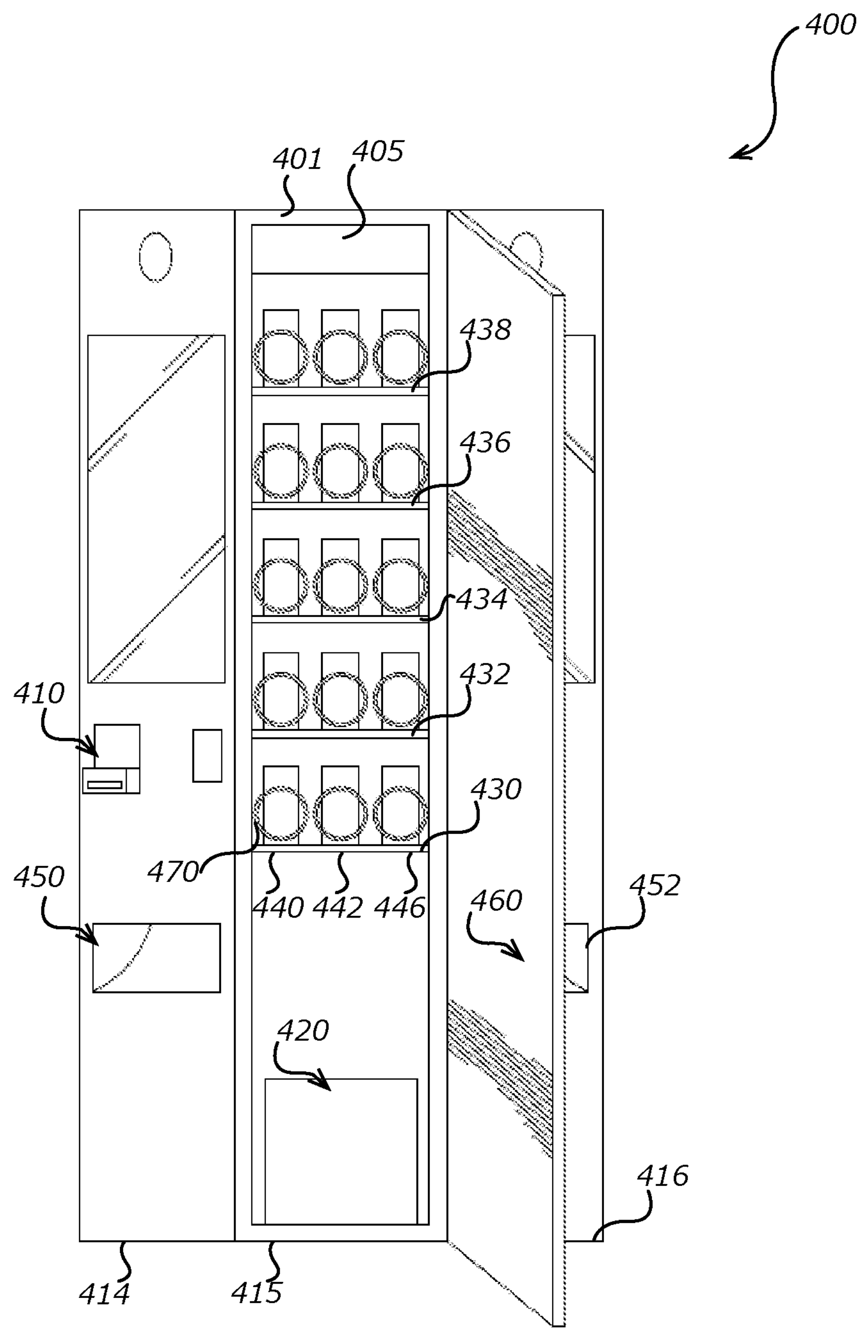
FIG. 4 illustrates an example view of an internal shared storage of a multi-user kiosk in accordance with various embodiments.

FIG. 4 illustrates an example view 400 of an internal shared storage 401 of a multi-user kiosk in accordance with various embodiments. In the example, storage door 460 on non-interface panel 415 is unlocked and opened, allowing access to shared storage 401. Products (also referred to as items) dispensed by the kiosk are stored in shared storage 401. In an embodiment, the shared storage 401 is a carousel of a plurality of carousel faces and can rotate about a vertical axis. A motor for rotating the carousel may be housed in a casing 420. As shown in this example, only one carousel face 405 (e.g., containing a column of trays 430, 432, 434, 436, and 438) is visible at opened storage door 460. In this example, the carousel face includes trays 430, 432, 434, 436, 438. Although five trays are shown in the example, any number of trays can be utilized in accordance with the embodiments described herein. Each tray 430, 432, 434, 436, 438 can be pulled forward to load, restock, rearrange, or adjust the position of items. Each tray includes an array of slots, for example, tray 430 includes slots 440, 442, 446. Although three slots are shown per tray in the example, any number of slots per tray can be utilized in accordance with the embodiments described herein. Each slot may be assigned to store one kind of product and/or a specific quantity of that product. For example, slot 440 may hold 10 units of a first product, slot 442 may hold 20 units of a third product, and slot 446 may hold 5 units of a third product.

Subsequent carousel faces can be exposed and accessible at opened storage door 460 by rotating the carousel. In an example, the number of carousel faces on a carousel may correspond with the number of interface sides on the kiosk. For example, an eight-sided multi-user kiosk that includes four interface sides (e.g., sides with input interfaces for interfacing with users and with a corresponding payment terminal and dispenser port) alternating between four non-interface panels (e.g., sides without input interface that provide privacy space between users and/or include a storage door), may have a carousel with four faces (e.g., the carousel is a square shaped prism). The carousel can rotate to position products from the plurality of carousel faces to reach a plurality of interface sides (and therefore dispense products to multiple users) simultaneously. The carousel can rotate to a loading position or dispensing position. As shown in the example, the carousel is in the loading position, where at least one carousel face is positioned at a storage door 460 (e.g., carousel face 405 is at opened storage door 460, allowing for product loading in trays 430, 432, 434, 436, and 438). Trays in subsequent carousel faces can be loaded and restocked when the carousel rotates clockwise or counter-clockwise by two sides (e.g., by two turns, for example, carousel face 405 moves from non-interface panel 415 to interface side 414 to the next kiosk side left of interface side 414 (not shown)) and a second carousel face (not shown) becomes exposed at opened storage door 460 (e.g., at non-interface panel 415). In the dispensing position, a carousel face is positioned at a plurality of interface sides. For example, if the carousel rotates clockwise or counter-clockwise by one side (e.g., by one turn, for example, carousel face 405 moves from non-interface panel 415 to interface side 414), carousel face 405 will be positioned directly behind interface side 414 and a second carousel face will be positioned directly behind interface side 416. Thus, if a first user occupies interface side 414 while a second user occupies interface side 416, the carousel can push a product forward to the first user at dispenser port 450 and to the second user at dispenser port 452 simultaneously. Rotating the carousel is discussed in further detail in FIGS. 5A, 5B, 6, and 7.

In an example, to load the shared storage 401, the carousel is rotated to a loading position, such that a carousel face faces non-interface panel 415 (e.g., at opened storage door 460). For example, the shared storage 401 as shown is rotated in the loading position, where an entire face (which includes trays 430, 432, 434, 436, 438) is fully accessible at the opened storage door 460. An admin user can load items into each slot of each slot. For example, the admin can pull out tray 430 and load a first product into slot 440, by placing one unit of the first product between each space in helical feeder coil 470. The admin can repeat the process for loading a second product into slot 442, 446, and so forth.

In another example, to dispense an item, for example from slot 440, the carousel rotates to a dispensing position (e.g., clockwise such that the carousel face 405 containing trays 430, 432, 434, 436, 438 is behind interface side 414). Helical feeder coil 470 rotates about a horizontal axis to push the item out of the slot 440, causing the item to fall into, for example, a chute (not shown) which collects and guides all items pushed from face 405 to dispenser port 450. In other embodiments, slots 440, 442, 446 may include other mechanisms for pushing an item forward, such as an automated spring or accordion extension arm behind a vertical plate.

Each slot 440, 442, 446 can have a predetermined depth to accommodate a predetermined quantity of a product. For example, slot 440 can be deeper than slot 442 in order to store a larger quantity of a product that is in higher demand In another example, the slots can be of equal depth, but some slots may have looser helical feeder coils (e.g., having a wider distance between coils) to accommodate bulkier items, whereas other slots may have tighter helical feeder coils (e.g., having smaller distance between coils) to accommodate smaller sized items. The admin can scan the product at scanner 410 prior to loading, allowing the system to identify the newest product being loaded. Further in the embodiment, slots 440, 442, 446 may include sensors (e.g., weight sensors, RFID readers, cameras, etc.) to automatically locate the position of the recently loaded item, by tracking in which slot the scanned item was placed. In yet another embodiment, the sensors can automatically determine both the identity and the position of the newly added item (without the need for scanner 410), such as by collecting and comparing data on the item's weight profile, weight distribution, RFID tag, product appearance and shape, and so forth. The sensors may also be positioned in other areas within the cavity of the kiosk, such as along the sides of trays 430, 432, 434, 436, 438, inside the ceiling of the kiosk, etc.

Figures 5A, 5B:
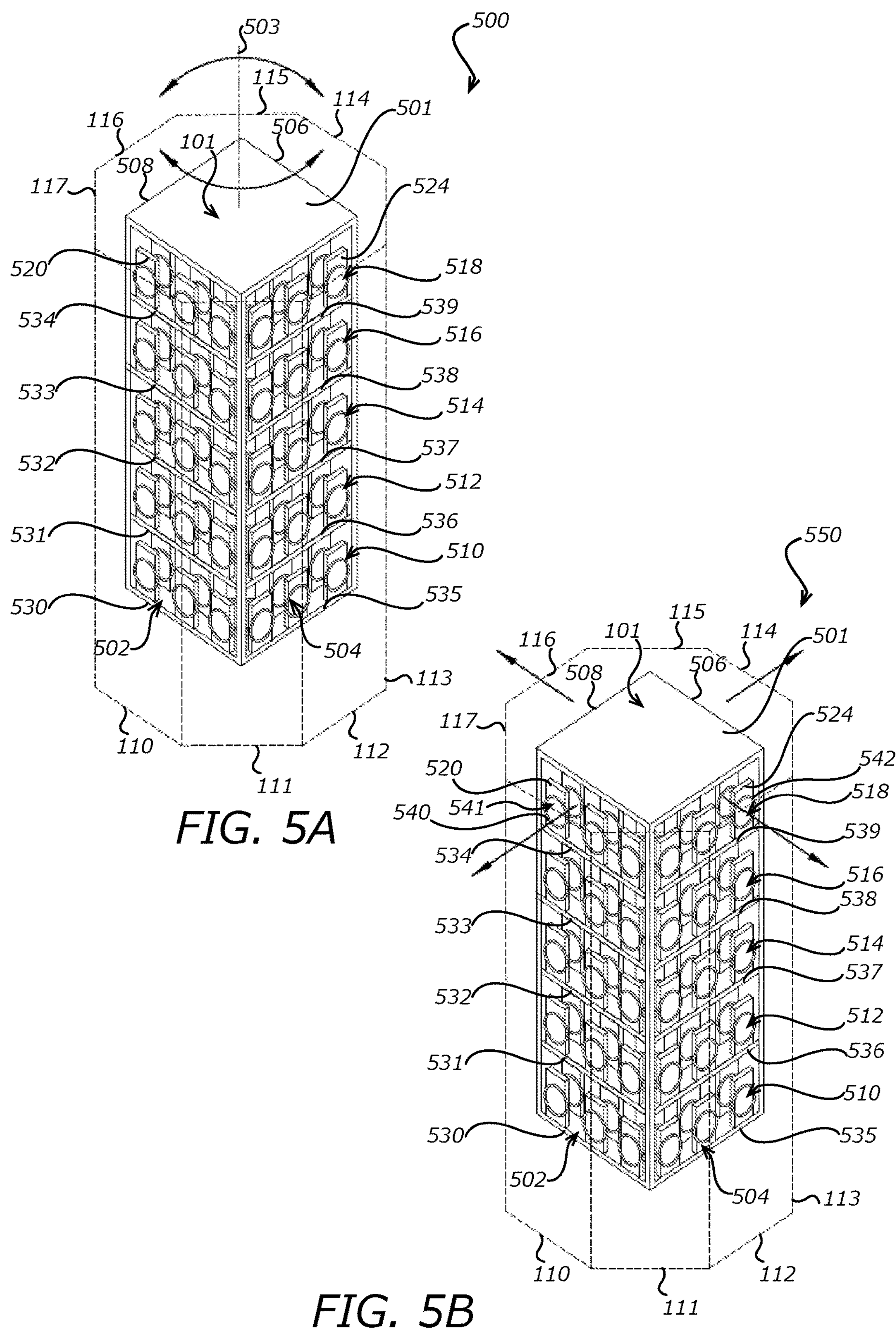
FIGS. 5A and 5B illustrate example internal views of an example shared storage of a multi-user kiosk in accordance with various embodiments.

FIG. 5A illustrates an internal view of an example 500 shared storage of a multi-user kiosk in accordance with various embodiments. In the example, the shared storage stores products that can be purchased from any interface side 110, 112, 114, 116 of kiosk 101. In an embodiment, the shared storage is a multi-sided carousel 501 having four carousel faces 502, 504, 506, and 508. As shown in the example, the carousel 501 includes five levels 510, 512, 514, 516, and 518, where each level has four trays (e.g., one tray on each face). For example, level 510 includes trays 530, 535, and two additional trays on the rear faces (not shown), level 512 includes trays 531, 536, and two additional trays on the rear faces (not shown), and so forth. Accordingly, face 502 includes trays 530, 531, 532, 533, and 534, while face 504 includes trays 535, 536, 537, 538, and 539, and so forth. Although five levels are shown in the example, any number of levels (and trays) can be utilized in accordance with the embodiments described herein.

Carousel 501 can be rotated about a vertical axis 503, to shift between dispensing position and loading position, or to move a carousel face (containing a particular product) from one side of the kiosk to another side. In the example, carousel 501 is in a dispensing position, where at least one carousel face is positioned directly behind an interface side 110, 112 (e.g., as described in FIG. 1A, an interface side includes input interfaces for interfacing with a user and a corresponding dispenser port, not shown). For example, face 502 is positioned facing behind interface side 110 while face 504 is positioned facing behind interface side 112, allowing the kiosk 101 to dispense products to a plurality of users at substantially a same time (e.g., products can be dispensed to a first user at interface side 110 from any of trays 530, 531, 532, 533, or 534 while products are dispensed to a second user at interface side 112 from any of trays 530, 531, 532, 533, or 534).

In an embodiment, when the first user at interface side 110 orders a product 524 located on face 504 (e.g., at interface side 112), kiosk 101 must rotate carousel 501 in order to dispense product 524 to the first user at interface side 110. Carousel 501 can rotate either counter-clockwise by six turns (e.g., by moving face 504 to pass by a sequence of six sides starting at 112 to 113-114-115-116-117-110) or clockwise by two turns (e.g., by moving face 504 to pass by a sequence of two sides starting at 112 to 111-110). In the example, carousel 501 will use the least number of turns (e.g., move face 504 past the least number of sides) to move purchased product 524 to the user at interface side 110. Once face 504 has been moved to face interface side 110, product 520 (on face 502) has been moved to face interface side 116 accordingly. Meanwhile, the second user at interface side 112 has purchased product 520, which is now located at interface side 116 (originally at interface side 110). To move product 520 to the second user at interface side 112, carousel 501 can either rotate counter-clockwise by four turns or clockwise by four turns as well. Because either direction yields the same number of turns, carousel 501 can rotate either clockwise or counter-clockwise to move product 520 to the second user at interface side 112.

In another example, carousel 501 can rotate to a loading position, where at least one carousel face is positioned directly behind a storage door (e.g., on a non-interface panel). In an embodiment, the kiosk 101 is an eight-sided kiosk with four interface sides alternating between four non-interface panels (e.g., interface side 110 is next to non-interface panel 111, followed by interface side 112, and so forth), where at least one non-interface panel includes a storage door (not shown) to access the carousel 501 for loading products. Therefore, rotating carousel 501 to move one face 502 to face an interface side 110 causes each of the remaining three faces 504, 506, 508 to align parallel with (e.g., faces behind) the remaining three interface sides (e.g., face 504 is parallel with interface side 112). Thus, in the dispensing position, four users can be serviced and receive products simultaneously because all four carousel faces are positioned behind an interface side (each of which can service and dispense products to a user). Likewise, rotating carousel 501 to move one face 502 to a non-interface panel 111 causes each of the remaining three faces 504, 506, 508 to align parallel with the remaining three non-interface panels (e.g., face 504 is parallel with non-interface panel 112), where one of the non-interface panels includes a storage door (not shown). Thus, in the loading position, the carousel 501 can be accessed and trays can be loaded with products because all four carousel faces are positioned behind a non-interface panel, at least one of which includes a storage door.

FIG. 5B illustrates an internal view of another example 550 shared storage of a multi-user kiosk 101 in accordance with various embodiments. In the example, although a user can browse and purchase among all products on all faces of the carousel 501, trays along a carousel face will only feed a dispenser port that the carousel face is positioned behind. For example, trays 530, 531, 532, 533, and 534 on face 502 will only feed a dispenser port on interface side 110. Upon dispensing product 520, helical feeder coil 540 rotates about a horizontal axis to push product 520 out of its slot 541, and product 520 falls into a chute (not shown) that leads to a dispenser port (not shown) on interface side 110. Because face 502 is facing interface side 110, trays 530, 531, 532, 533, and 534 may not feed products into chutes leading to dispenser ports on any other interface side (e.g., 112, 114, 116), unless carousel 501 is rotated such that face 502 is repositioned to face one of the other interface sides 112, 114, or 116.

In an example, carousel 501 may rotate a minimal number of turns to dispense to multiple users simultaneously. For example, a first user at interface side 112 purchases product 520 (located on face 502 at interface side 110), while a second user at interface side 114 purchases product 524 (located on face 504 at interface side 112). The minimal number of turns carousel 501 is required to make to fulfill both purchases is to rotate counter-clockwise by two turns (e.g., move each face 502, 504, 506, and 508 over by two sides). When carousel 501 makes the two counter-clockwise turns, face 502 (containing product 520) reaches interface side 112 and face 504 (containing product 524) reaches interface side 114 simultaneously. The carousel then rotates helical feeder coil 540 to push product 520 out of tray 534 and into a dispenser port at interface side 112 (to the first user) and rotates helical feeder coil 542 to push product 524 out of tray 539 and into a dispenser port at interface side 114 (to the second user) at substantially the same time.

In another example, when multiple users purchase products from multiple interface sides and their purchases require different amount of turns to fulfill, carousel 501 may dispense products to one user at one interface side as it is rotating its faces en route to dispense products to another user at another interface side. Making intermediary product deposits to dispenser ports along a rotation can minimize the number of turns required for the carousel 501, leading to faster dispensing times for multiple users. For example, a first user purchases product 520 at interface side 112 (located on face 502 at interface side 110). The minimal number of turns (also referred to as the minimal rotation sequence) to deliver product 520 to the first user at interface side 112 is two turns counter-clockwise (e.g., move face 502 from interface side 110 and pass by sides 111-112). Meanwhile, a third user at interface side 116 purchases product 524 (located on face 504 at interface side 112). The minimal number of turns to deliver product 524 to the third user at interface side 116 is four turns in either direction. However, because a rotation of four turns counter-clockwise would encompass the minimal rotation sequence for dispensing product 520 to the first user, carousel 501 will rotate a total of four turns counter-clockwise. Therefore, carousel 501 will drop of product 520 along the way (e.g., when face 502 reaches the first user at interface side 112) in dropping off product 524 (e.g., when face 504 reaches the third user at interface side 116).

Figure 6:
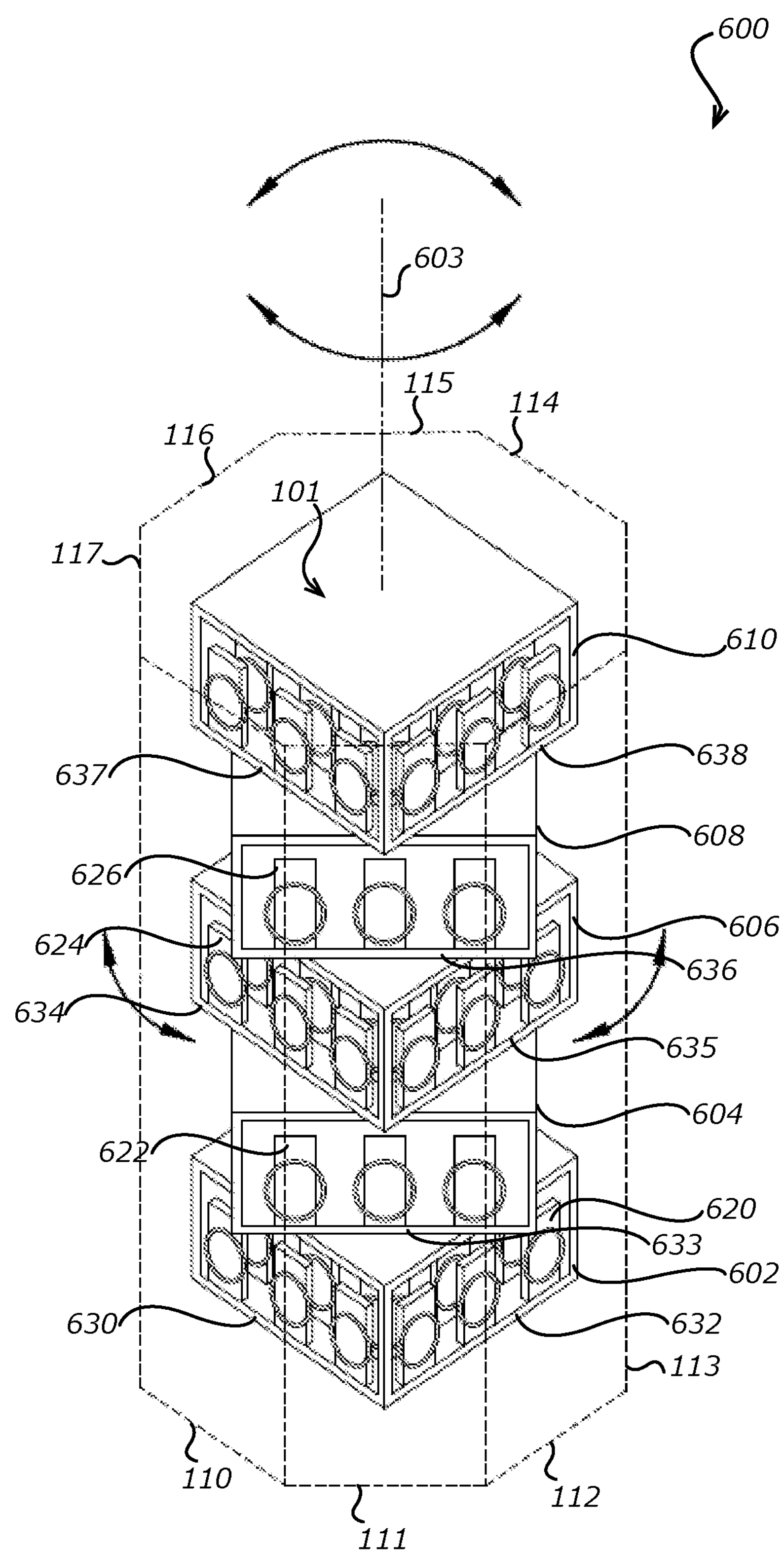
FIG. 6 illustrates another example shared storage of a multi-user kiosk in accordance with various embodiments.

FIG. 6 illustrates another example 600 of a shared storage of multi-user kiosk 101 in accordance with various embodiments. In the example, the shared storage carries products that can be purchased by a user from any interface side 110, 112, 114, 116 of kiosk 101. In an embodiment, the shared storage is a plurality of carousels 602, 604, 606, 608, and 610, stacked as a single column. The carousels 602, 604, 606, 608, and 610 include trays 630, 632, 633, 634, 635, 636, 637, and 638, as shown.

Each carousel 602, 604, 606, 608, and 610 (also referred to as the first, second, third, fourth, and fifth carousel, respectively) can rotate about a shared vertical axis 603, and each carousel can rotate in independent directions of each other. By rotating each carousel in multiple directions simultaneously, products positioned at various locations in the shared storage can be moved (through a plurality of rotation sequences) to reach and be dispensed to a plurality of users (each user at an interface side, e.g., a side of the kiosk with an input interface for a user to purchase a product and with a corresponding dispenser port) at the same time and at the same kiosk.

In an example, a first user at interface side 110 may purchase product 620 (located at the first carousel 602 in tray 632, facing interface side 112), a second user at interface side 112 may purchase product 622 (located at the second carousel 604 in tray 633, facing non-interface panel 111), a third user at interface side 114 may purchase product 624 (located at the third carousel 606 in tray 634, facing interface side 110), and a fourth user at interface side 116 may purchase product 626 (located at the fourth carousel in tray 636, facing non-interface panel 111). To deliver the purchased products to each user at substantially the same time, the carousels 602, 604, 606, and 608 will rotate by a minimal number of turns (e.g., minimal rotation sequence) required to move the product from their current position to the interface side where the appropriate user is. Thus, the first carousel 602 will rotate 2 turns clockwise (e.g. move tray 632 containing product 620 from interface side 112 to the first user at interface side 110), the second carousel 604 will rotate one turn counter-clockwise (e.g., move tray 633 containing product 622 from non-interface panel 111 to the second user at interface side 112), the third carousel 606 can rotate four turns in either clockwise or counter-clockwise direction (e.g., move tray 634 containing product 624 from interface side 110 to the third user at interface side 114), the fourth carousel 608 will rotate three turns clockwise (e.g., move tray 636 containing product 626 from non-interface panel 111 to the fourth user at interface side 116) all at the same time, while the fifth carousel 610 remains stationary. When the four carousels 602, 604, 606, and 608 have rotated to their appropriate trays to the appropriate user, each carousel will dispense the products 620, 622, 624, 626 (e.g., to the first, second, third, and fourth users respectively) accordingly.

In the example, the third carousel 606 may rotate four turns in either a clockwise or counter-clockwise direction to move tray 634 containing product 624 from interface side 110 to the third user at interface side 114. However, in the situation where another product in tray 634 is due to another user in less turns (e.g., an intermediary delivery along the way to rotating tray 634 to the third user at interface side 114), then the rotation direction will be determined by the position of the intermediary delivery relative to the carousel's starting position (e.g., interface side 110) and ending position (e.g., arrival at interface side 114). For example, if the second user (at interface side 112) also purchased a second product from tray 634, it is closer to move tray 634 from starting position (at interface side 110) to the intermediary delivery (at the second user at interface side 112) in a counter-clockwise direction than a clockwise one. Thus, the third carousel 606 will rotate counter-clockwise to drop off the second product to the second user in two turns before reaching the fourth user (at interface side 114) on the fourth turn.

In the situation where two users order products from the same carousel and tray, the carousel will rotate and deliver the product to the user who is at the interface side closest to the tray first. The kiosk system may update its inventory to accommodate for sales of more popular products. In an example, if four users at kiosk 101 order the same popular product A, the shared storage may be configured to stock product A in at least one tray 630, 633, 634, and 636 of at least four carousels 602, 604, 606, 608, respectively, so that each carousel 602, 604, 606, 608 can rotate in different directions to dispense a unit of product A at one of the four interface sides, such that all four users simultaneously receive their purchase of product A without needing to wait for a single carousel to deliver to one user at a time.

The example shows the positions of the carousels 602, 604, 606, 608, and 610 staggered. The first 602, third 606, and fifth 610 carousels are in a dispensing position (trays facing interface sides) while the second 604 and fourth 608 carousels are in a loading position (trays facing non-interface panels, at least one of which includes a storage door, not shown, for accessing and loading the shared storage). In an embodiment, the carousels can be realigned (all carousels rotate into loading position and therefore all trays are parallel with each other) when an admin user requests access to the storage, for example, to replenish inventory or perform system maintenance on the kiosk 101. In another example, the default position (after restocking or maintaining the storage and allowing customers to use the kiosk), may be preconfigured such that all carousels begin in the dispensing position, and then rotate accordingly to accommodate a set of purchases until the next product reloading is scheduled.

Although the example shows each carousel having a height of one level (e.g., one level of four trays around the carousel), any number of levels can be included in each carousel in accordance with the embodiment described herein. For example, in another embodiment, a first carousel may include two levels 602 and 604 that rotate together as a single unit, while a second carousel may include three levels 606, 608, and 610 that rotate together as a single unit, and the first carousel and second carousel can rotate independently of each other. In yet another embodiment, the total number of individual carousels in the kiosk can correspond with the number of interface sides. For example, an eight-sided multi-user kiosk that includes four interface sides (e.g., sides with input interfaces for interfacing with users and with a corresponding payment terminal and dispenser port) alternating between four non-interface panels (e.g., sides without input interface that provide privacy space between users and/or include a storage door), may have four carousels stacked upon each other that rotate independently of each other. Each of the four carousels may have a plurality of trays (e.g., two trays per level in a carousel, three trays, four trays, etc.). In another example, a ten-sided multi-user kiosk with five interface sides alternating between five non-interface panels may have five carousels stacked upon each other, and each carousel can have any number of trays per level. In yet another example, the number of trays around each level in a carousel may correspond with the number of input interfaces. As illustrated in this example, in the eight-sided multi-user kiosk with four interface sides, each carousel in the stack of carousels may include four trays per level. In another example, a ten-sided multi-user kiosk with five interface sides may have any number of stacked carousels (e.g., two carousels, five carousels, etc.), but each carousel includes five trays per level (e.g., when all carousels are aligned as a stacked column in a single position, for example, a dispensing position, the stacked column is in the shape of a pentagonal prism).

Figure 7:
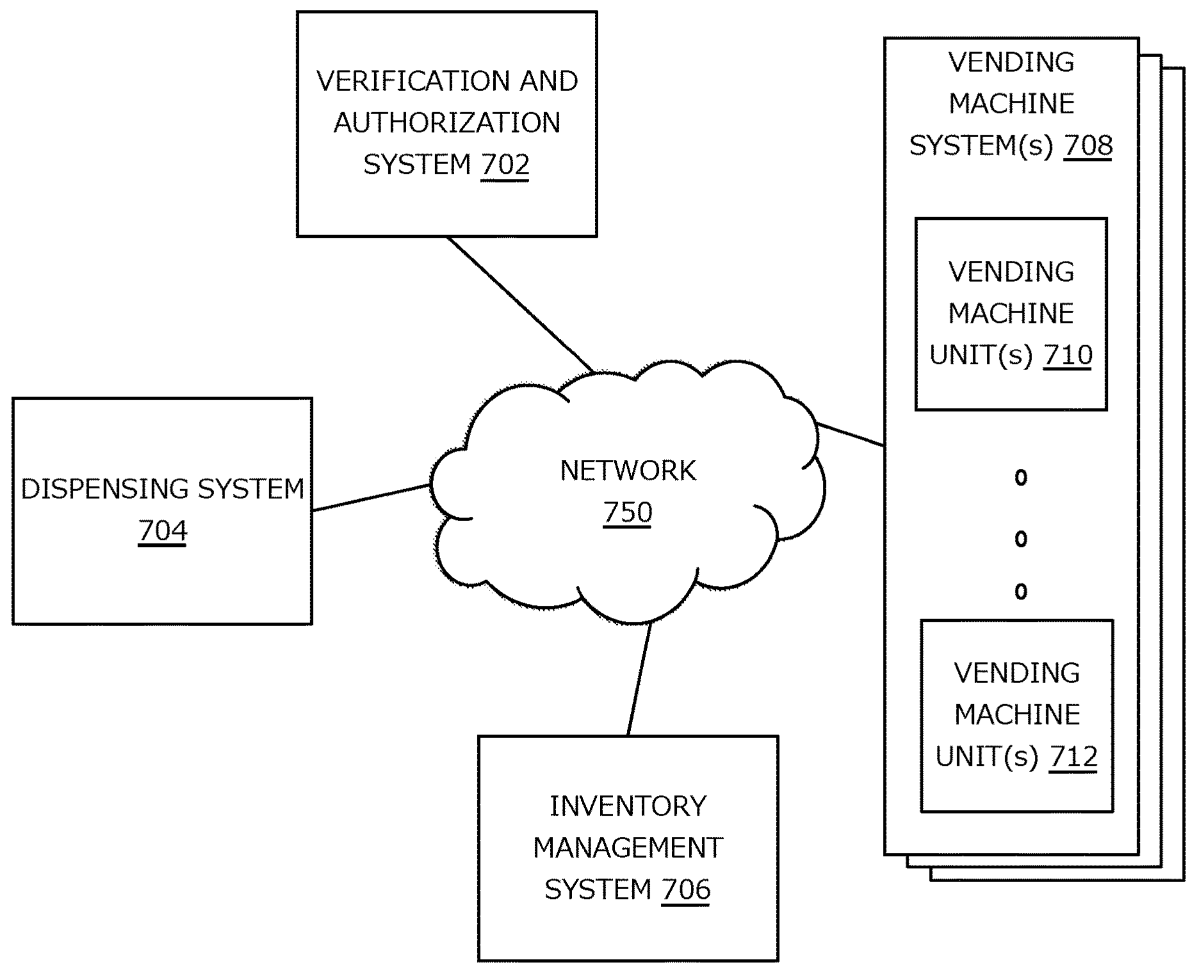
FIG. 7 illustrates a network for providing multi-user kiosk system resources in accordance with an exemplary embodiment.

FIG. 7 illustrates exemplary embodiment of a multi-user kiosk system according to an embodiment. The system includes one or more vending machine systems 708, a verification and authorization system 702, a dispensing system 704, an inventory management system 706, and a network 750 over which the various systems communicate and interact. The various computing devices described herein are exemplary and for illustration purposes only. The system may be reorganized or consolidated, as understood by a person of ordinary skill in the art, to perform the same tasks on one or more other servers or computing devices without departing from the scope of the invention.

In one embodiment, the vending machine system 708 may be comprised of one or more vending machine units 710, 712 (also referred to as dispensing units). Generally, the vending machine system 708 is operative to store and dispense products to a plurality of users at substantially the same time. Vending machine system 708 may include a plurality of vending machine units 710, 712, and so forth. Vending machine units 710, 712 can be multi-user kiosks having a plurality of sides to service a plurality of users simultaneously. The vending machine units 710, 712 can have multiple sides, shaped as a polygonal prism. In an embodiment, a vending machine unit 710, 712 is an eight-sided multi-user kiosk (e.g., shaped as an octagonal prism) that includes four interface sides (e.g., sides with input interfaces, such as a touchscreen, for interfacing with users and with a corresponding payment terminal and dispenser port) alternating between four non-interface panels (e.g., sides without input interface that provide privacy space between users and/or include a storage door). In another embodiment, vending machine units 710, 712 may have nines, ten sides, eleven sides, etc. For example, a kiosk could be in the shape of a hexagonal prism, with three sides having interface sides, and a non-interface panel in between each interface side to provide space and privacy for users. In yet another embodiment, other ratios of the number of interface sides to non-interface panels may be used and/or the sides may be of varying widths. For example, in a kiosk having the shape of a pentagonal prism, all five sides may have an input interface. The five sides may be large in width (e.g., at least twice the width of an average person, etc.) in order to space users per side as far enough apart from each other as to provide space and privacy in their kiosk transactions. In yet another embodiment, vending machine system 708 may include vending machine units of a plurality of shapes. For example, vending machine unit 710 may be in the shape of an octagonal prism, while vending machine unit 712 may be in the shape of a decagonal prism.

In an embodiment, products in a vending machine unit 710, 712 are stored in a shared storage, where the shared storage is a plurality of stacked carousels that rotate about a shared vertical axis. The carousels can rotate in clockwise and counter-clockwise positions independent of each other. Each carousel has a height of at least one level of a plurality of trays that revolve with the carousel. Each tray includes an array of slots, each slot be able to store a predetermined quantity of a product. Each slot can have a helical feeder coil to space out the units of each product. When carousels are rotated such that their trays face an interface side of the kiosk (e.g., rotated to a dispensing position), the helical feeder coil may rotate about a horizontal axis to push the product out of the tray and deposit the product into a dispenser port to a user at the interface side. When carousels may be rotated to face their trays to a non-interface panel with a storage door (e.g., rotated to a loading position), the trays behind the storage door may be accessible to an authorized user (e.g., admin, staff, employee, etc.) to restock the storage with more products.

Verification and authorization system 702 is operable to verify and authorize a user prior to permitting the user to purchase and/or load products at a vending machine unit 710, 712. In the example, real time information about the user's identity is collected and verified against the user's identification documentation. For example, cameras may collect biometric data (e.g., capture photograph of user's face, scan user's fingerprint, etc.) and compare the biometric data against the user's identification documentation, such as a driver's license, passport, employee badge, etc. When the user's biometric data has been confirmed to match the information in the user's identification documentation, verification and authorization system 702 proceeds to determine whether the user is authorized with access privileges to the products in the kiosk. Access privileges may range among no access to the products (e.g., user is under 18 years of age, user lacks a valid prescription, etc.), purchase access, or storage access (e.g., loading, removing, adjusting products within the kiosk storage), among others. The purchase of specific products may be restricted, and may only be available for consumers who satisfy an age threshold (e.g., at least 18 years of age, 21 years of age, etc.), hold a valid prescription, hold a valid license or permit, or hold paid membership, and the like. Storage access is authorized if the user is, for example, an admin user such as an employee or manager who is allowed to open the kiosk to restock the storage, conduct repairs or system maintenance, etc.

Dispensing system 704 is operable to manage and facilitate the dispensing of products stored in a kiosk to a user or a plurality of users at substantially the same time. In an example, a first user may be located at a first interface side of a kiosk, while a second user is located at a second interface side of the kiosk. The first user purchases a first product located in a first carousel and the second user purchases a second product located in a second carousel (e.g., the second carousel is stacked on top of the first carousel in the kiosk and can rotate independently of the first carousel). Based on the storage address (e.g., carousel number, tray number, and slot number) of each product and the rotational position of the products (e.g., which kiosk side the tray containing the product is currently facing behind), dispensing system 704 determines a minimal number of turns (e.g., shortest sequence of kiosk sides for a product to be rotated past and which rotational direction) required to rotate each carousel to move each product to the appropriate user. For example, the first carousel may be rotated two turns clockwise to move the first product to the first user, and at the same time, the second carousel may be rotated three turns counter-clockwise to move the second product to the second user, thus dispensing the products to each user at different sides of the kiosk at substantially the same time.

Inventory management system 706 is operable to manage the storage and loading of products in a kiosk. An authorized user, such as an admin, employee, maintenance professional, etc., may be allowed storage access to load, adjust, remove, or replace products in the shared storage. Inventory management system 706 may maintain an inventory list that pre-assigns a storage address (e.g., carousel number, tray number, and slot number) for each product. When an authorized admin loads a product into its assigned storage address, sensors (e.g., weight sensors, RFID readers, etc.) in the slot can identify the loaded item and confirm whether the correct product has been loaded. In another embodiment, an admin may load any product into any empty slot, and sensors within the slot (e.g., weight sensors, image sensors, RFID readers, etc.) may identify the product and update the inventory list accordingly. For example, inventory management system 706 may update and assign the storage address of the empty slot with details of the newly added product, such as product name, weight, price, expiration date, etc. Weight sensors may also be used to monitor the weight of products within each slot to determine whether the quantity of each product has dropped below a quantity threshold (e.g., there is less than a pre-configured number of units of the product remaining in the slot or the slot has become empty) and needs to be replenished.

Network cloud 750 generally represents a network or collection of networks (such as the Internet or a corporate intranet, or a combination of both) over which the various components illustrated in FIG. 7 (including other components that may be necessary to execute the system described herein, as would be readily understood to a person of ordinary skill in the art). In particular embodiments, network 750 is an intranet, an extranet, a virtual private network (VPN), a local area network (LAN), a wireless LAN (WLAN), a wide area network (WAN), a metropolitan area network (MAN), a portion of the Internet, or another network 750 or a combination of two or more such networks 750. One or more links connect the systems and databases described herein to the network 750. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 750, and any suitable link for connecting the various systems and databases described herein.

The network 750 connects the various systems and computing devices described or referenced herein. In particular embodiments, network 750 is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. The present disclosure contemplates any suitable network.

One or more links couple one or more systems, engines or devices to the network 750. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 750.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 7, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 8:
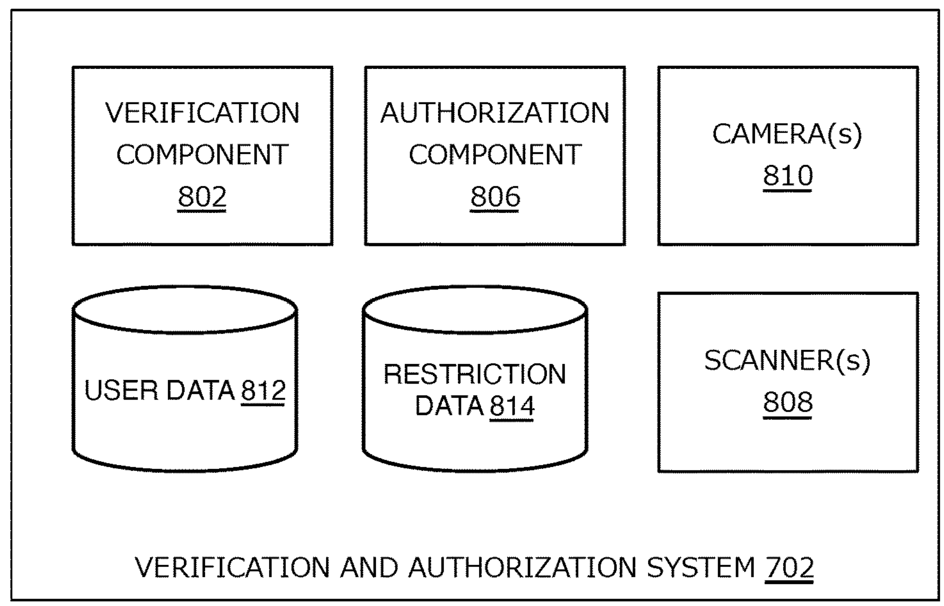
FIG. 8 illustrates an example verification and authorization system in accordance with various embodiments.

FIG. 8 illustrates an example verification and authorization system 702 in accordance with various embodiments. In the example, verification and authorization system 702 includes user data store 812, restriction data store 814, verification component 802, authorization component 806, camera(s) 810, and scanner(s) 808. User data store 812 includes user data, such as first and last name, residential address, and the like. User data may also include personal records pulled from a government or public database, data relating to a user's licenses or permits (e.g., licenses or permits to purchase goods regulated by the government, licenses or permits to purchase regulated quantities of pharmaceuticals, chemicals, etc.), a user's medical prescription, and so forth. Restriction data store 814 stores data relating to authorization levels to the items in a multi-user kiosk, for example, no access, access to purchase only, access to storage, and so forth. Restrictions on purchases of items in a multi-user kiosk can include age thresholds (e.g., 18 years of age or older, 21 years of age or order, etc.), license or permit requirements, membership or subscription requirements (e.g., subscription fees are current, different tiers of membership enable access to different items, etc.). Restrictions on storage access (e.g., ability to open kiosk and load items) can include admin or employee status (e.g., have employee badge), maintenance professional status (e.g., have maintenance professional certification), etc.

Verification component 802 is operable to authenticate (e.g., verify) a user's identity, for example, by collecting real time information about the user's identity and confirming the information matches the user's identification documentation. For example, when a user approaches a multi-user kiosk, verification component 802 may instruct camera(s) 810 to capture biometric data (e.g., images of the user's facial features) and/or prompt the user (e.g., via input interface display) to input his name and address, which are stored in data store 812. Verification component 802 then collects the user's identification documentation, for example, by prompting the user to upload (e.g., scan) his identification documents (e.g., driver's license, passport, employee badge, etc.) at scanner 808 or pulling identification data from government personal records, and the like. Verification component 802 confirms whether the captured images of the user (or user's name, address, etc.) match the image(s) and information in the user's identification documents. In another embodiment, other biometric data may be used to verify the user's identity, such as scanner the user's fingerprint with by scanner 808, and so forth.

Camera(s) 810 may be affixed to the top of the multi-user kiosk in front of each interface side (e.g., a side with an input interface for user interaction). In another embodiment, a plurality of cameras 810 may be installed around the area within a predetermined distance from the multi-user kiosk. For example, a multi-user kiosk located within a store may be coupled (e.g., connected to receive data from) with the plurality of cameras 810 installed in each corner of the store and/or the store's entrance and exit. Verification component 802 may receive images of a user from various angles in the store and pre-verify the user's identity, such that by the time the user reaches the multi-user kiosk, his verification process has already been completed. Therefore, the number of verification steps that the user must undergo during his time at the kiosk has been reduced, which reduces wait times for subsequent users at the kiosk and increases efficiency of kiosk transactions.

Authorization component 806 is operable to authorize a user's ability to access items within the kiosk (e.g., whether a user is granted no access, access to purchase only, or access to kiosk storage). If restriction data indicates a restriction on the sale of items in the kiosk, authorization component 806 will confirm whether the user meets the requirements for purchasing the items. Based on such restrictions, authorization component 806 may prompt the user to scan authorization documentation at a scanner 808. An authorization document can include, for example, a prescription, a license or permit, driver's license or passport providing the user's age, an employee badge or tag, etc. For example, purchase of products within the kiosk may require consumers to be over 18 years of age and have a valid prescription. Authorization component 806 will prompt (e.g., via an input interface screen on an interface side of the kiosk) the user to upload (e.g., scan) his driver's license and prescription. Authorization component 806 evaluates the user's age and validity of the prescription by confirming the birthdate on the driver's license is prior to a predetermined date (e.g., 18 years prior to the current date) and that the expiration date of the prescription is equal to or later than the current date.

In another embodiment, the user may be pre-authorized prior to approaching the kiosk, for example, if the user is a repeat customer. In the example, the user has previously been verified by verification component 802 (e.g., camera 810 previously captured his image and verification component 802 has compared the image with the user's government personal records or user's uploaded driver's license) and previously authorized by authorization component 806 (e.g., authorization component 806 previously determined that the user is over 18 years of age and holds a prescription that is valid through a particular date). Therefore, when camera 810 detects the user's presence near the kiosk, verification component 802 will notify authorization component 806 that the user is pre-verified, and authorization component 806 will confirm that the user has been pre-authorized and immediately allow user to access the products (e.g., skip verification and authorization pages on the input interface screen and allow the user to immediately begin browsing and selecting products). Therefore, the verification and authorization processes are streamlined for the user, reducing customer wait times and increasing efficiency of kiosk transactions.

Figure 9:
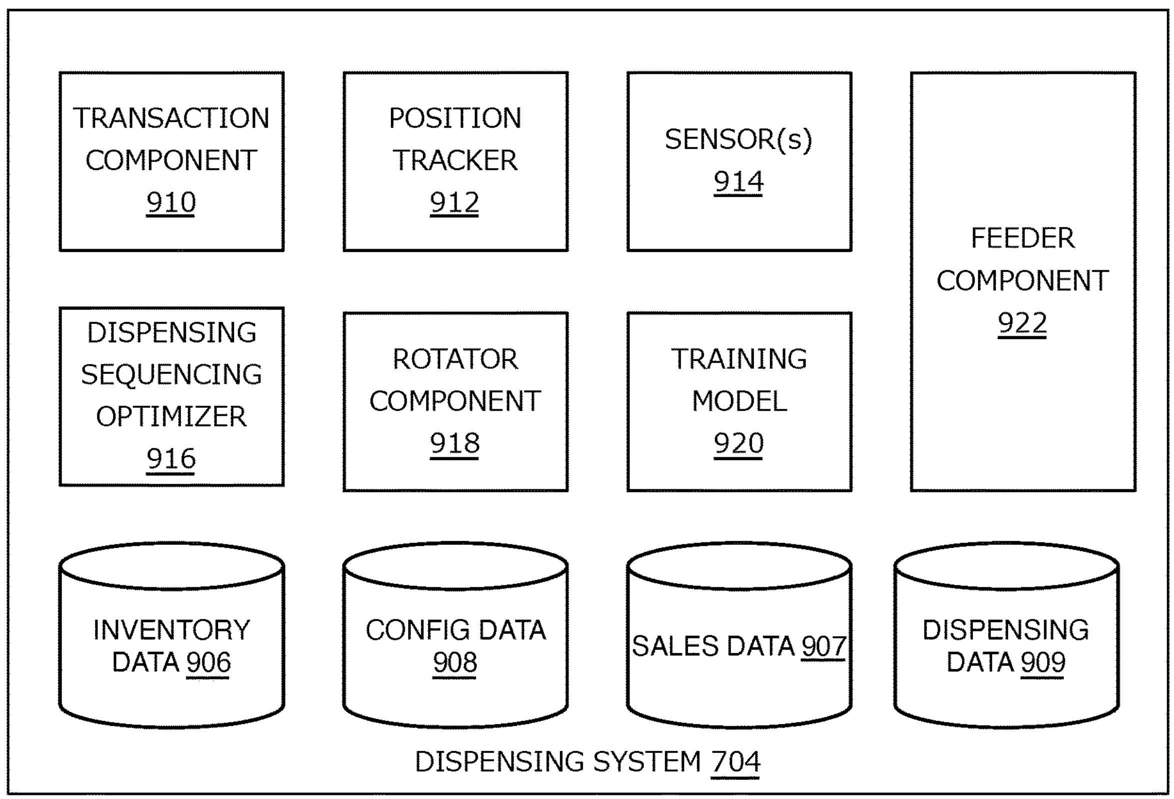
FIG. 9 illustrates an example dispensing system in accordance with various embodiments.

FIG. 9 illustrates an example dispensing system 704 in accordance with various embodiments. In the example, dispensing system 704 includes configuration data store 908, inventory data store 906, sales data store 907, dispensing data 909, transaction component 910, position tracker 912, sensor(s) 914, dispensing position optimizer 916, rotator component 918, training model 920, and feeder component 922. In the example, configuration data store 908 may include data on the number of carousels (stacked as a column of carousels) in the kiosk, number of slots and trays in each carousel, the vertical positions of each carousel (e.g., which carousel is stacked on which in the column of the plurality of carousels), the rotational position of each carousel (e.g., which trays are facing which interface side of the kiosk), arrangement of each carousel and corresponding trays in a dispensing position (e.g., when carousels are rotated such that there is at least one tray facing each interface side), arrangement of each carousel and corresponding trays in a loading position (e.g., when carousels are rotated such that there is at least one tray facing a door of the kiosk for loading products), and so forth. Inventory data store 906 includes data relating to the products within the kiosk, for example, a list of all products currently in the kiosk, quantity of each product, price of each product, whether a product needs to be replaced or restocked, a list of the next shipment of products that need to be loaded into the kiosk, the date of the next shipment, and so forth. Inventory data also includes the storage address of each product, for example, identified by carousel number, tray number, and slot number. Sales data store 907 stores data relating to each transaction, such as the product purchased, price, quantity, the date and time of purchase, and so forth.

Transaction component 910 manages multi-user kiosk transactions, for example, purchases by a plurality of users who interface with the multi-user kiosk. Transaction component 910 facilitates each purchase between the kiosk and each of the plurality of users by tracking which user is located at which interface side of the kiosk, and providing separate interface displays to each user for browsing and selecting products. Upon a purchase by a user, transaction component 910 collects the appropriate payment from the user. Data on each purchase is stored in sales data store 907, such as a list of products purchased by each user, quantity of each product sold, date of each purchase, etc. When payment has been completed, transaction component 910 communicates with dispensing position optimizer 916 to initiate dispensing the appropriate product to each user. Transaction component 910 tracks pending purchases (e.g., transactions where products have been paid for but not yet to dispensed) by keeping a running log of which user purchased which product, and at which interface side and corresponding dispenser port the user is located.

Position tracker 912 identifies the storage address and rotational position of the product in each pending purchase. The storage address identifies where in the kiosk storage a product has been loaded. The rotational position identifies which side of the kiosk the product is currently behind (or has rotated to). In an embodiment, products are stored in a shared storage, where the shared storage is a plurality of stacked carousels that rotate about a shared vertical axis. The carousels can rotate in clockwise and counter-clockwise positions independent of each other. Each carousel has a height of at least one level of a plurality of trays that revolve with the carousel. When a carousel is in a dispensing position, each tray faces behind an interface side (e.g., a side with an input interface for user to purchase a product and with a corresponding dispenser port) of the kiosk. Each tray includes an array of slots, each slot storing a predetermined quantity of a product. Each slot can have a helical feeder coil to space out the units of each product, and the helical feeder coil may rotate about a horizontal axis to push the product out of the tray and deposit the product into a dispenser port to a user at an interface side. Position tracker 912 uses the product's storage address (e.g., identified by carousel number, tray number, and slot number, and so forth) to determine the product's current position in the shared storage (e.g., which side of the kiosk the tray containing the product is facing behind) compared to its destination (e.g., at which interface side of the kiosk the purchasing user is located). Position tracker 912 may implement sensor(s) 914 (e.g., weight sensors in the trays, RFID readers in the slots or behind each side wall, etc.) to detect which products are positioned behind each kiosk side. For example, an RFID reader or image sensor behind an interface side can read which storage addresses (e.g., products in slots) pass by the interface side during a carousel rotation and which storage addresses arrive at the interface side at the end of a rotation. Position tracker 912 may also keep a record of all of the sides a product has stopped by during carousel rotation, with the most recent record being the product's current rotational position. The storage address and rotational position are communicated to dispensing sequence optimizer 916 for minimizing the rotations necessary to deliver each product to a plurality of users at substantially a same time.

Dispensing sequence optimizer 916 is operable to calculate the optimal (e.g., minimal) rotation sequence for rotating the plurality of carousels to dispense a plurality of products to a plurality of users at substantially a same time. In an example, a dispensing sequence includes a sequence of kiosk sides that lists where the product starts (e.g., rotational position), passes by, and arrives (e.g., the appropriate dispenser port) and a direction (e.g., counter-clockwise, clockwise, or either). Dispensing sequence optimizer 916 takes the storage address and rotational position of the product (or plurality of products), the time each purchase request was entered, the location of the purchasing user (e.g., which interface side of the kiosk the user is located), and so forth, to determine which carousels should be rotated, by how many turns, which direction, and the time expected for the product to reach the appropriate dispenser port.

For example, a first user and second user may be located at consecutive interface sides of a kiosk, where the first user purchases a first product located in a first carousel and the second user purchases a second product located in a second carousel (e.g., the second carousel is stacked on top of the first carousel in the kiosk). Transaction component 910 records the kiosk locations of the users (e.g., at which interface side each user is engaging in the transaction and inputting the purchase request). Based on the storage address and positional rotation of the first and second products as determined by position tracker 912, and the kiosk locations of the first user and the second user, dispensing sequence optimizer 916 can determine a shortest path (e.g., shortest sequence of kiosk sides for a product to be rotated past and which rotational direction) between each product and each user, calculates an expected time for dispensing each product, and determines which carousel must execute the shortest path (e.g., which of the plurality of carousels must be rotated and when it should rotate). Dispensing sequence optimizer 916 instructs rotator component 918 to rotate the first carousel in a first direction by a first number of turns (e.g., number of sides to rotate the product past) and to rotate the second carousel in a second direction by a second number of turns. Once the first carousel has been rotated such that the first product is positioned behind a first dispenser port at the first user and the second carousel has been rotated such that the second product is positioned behind a second dispenser port at the second user, rotator component 918 maintains the carousels in a static position (e.g., restricts the carousels from rotating further) until the products have been fully dispensed. In an example, feeder component 922 dispenses the products by pushing the products forward out of their respective trays (e.g., by rotating a helical feeder coil about a horizontal axis, moving a vertical plate forward with an actuator or accordion arm, etc.) until the product is dropped into a chute or conveyor belt, etc. that leads into a corresponding dispenser port. The executed rotation sequences, expected dispensing times, actual dispensing times, dispensing destinations, and the like are saved as dispensing data 909.

Training model 920 is can be trained on dispensing data 909 to improve optimization of dispensing sequences. For example, training model 920 may be trained on deviations between actual dispensing times and expected dispensing times, wait times for each user between submitting a purchase request and receiving the product in the dispenser port, the rotation sequences of all purchases, and so forth. Training model 920 can recognize overlapping rotation sequences and learn how to consolidate portions of the overlapping rotation. For example, training model 920 can consolidate rotation sequences for dispensing products to two users by calculating a combined shortest path and dispensing order (e.g. which user to dispense to first) that handles one user as a final destination and the remaining user(s) as an intermediary delivery en route. In the example, the first user purchases a first product located in a first carousel and the second user purchases a second product located in the same carousel and same tray. To deliver the product to the second user would require an equal amount of (e.g., four) turns in either clockwise or counter-clockwise direction, but to deliver the product to the first user would require less turns (e.g., two) but only in a counter-clockwise direction. Training model 920 evaluates the possible rotation sequences for delivering to the second user, maps it against the possible rotation sequences for delivering to the first user, and determines that the rotation sequences for delivering to both users overlap if the carousel rotated in the counter-clockwise direction. Thus, training model 920 learns to in this set of circumstances to designate the second user as the final destination and the first user as an intermediary delivery en route to the second user. Training model 920 continues to train on comparing the set of possible rotation sequences of all pending purchases to learn to consolidate rotation sequences and therefore optimize dispensing times to the plurality of users.

Figure 10:
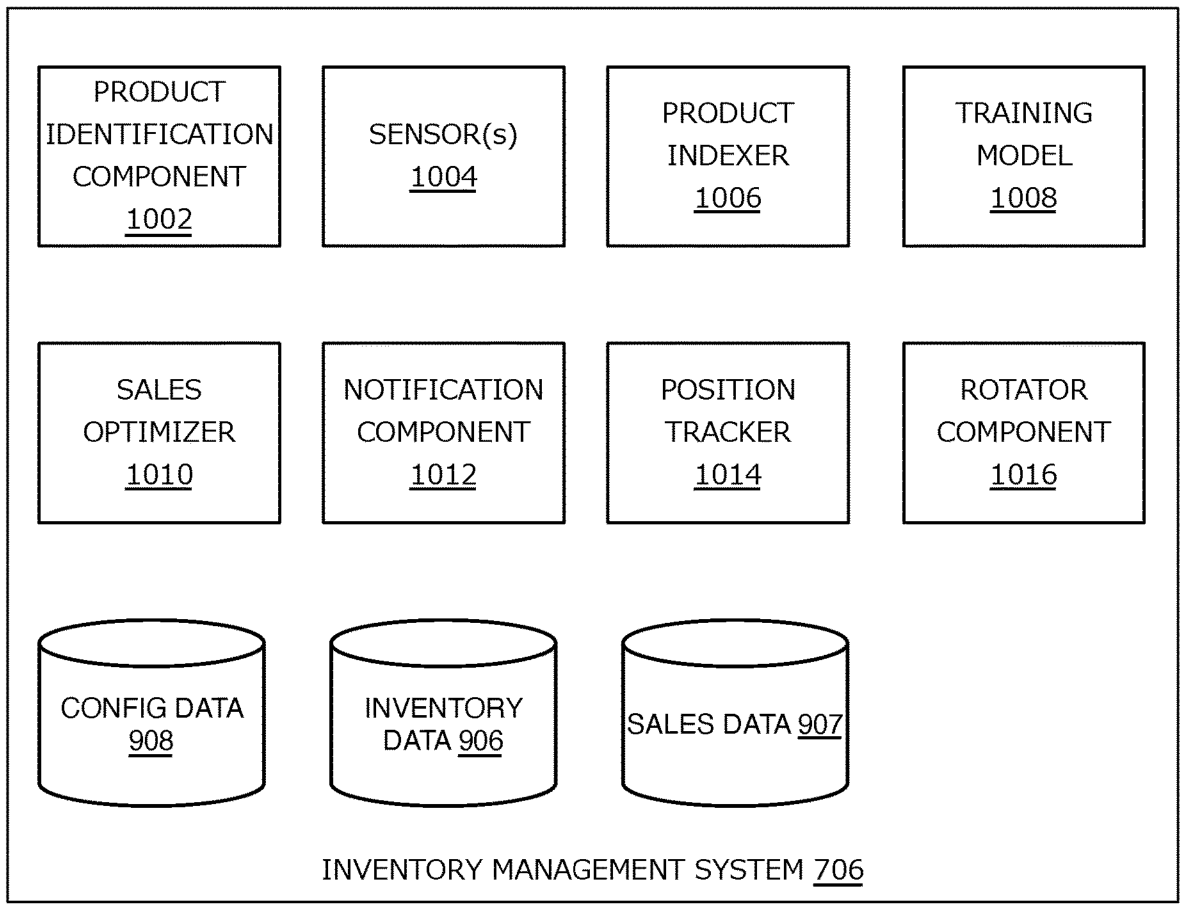
FIG. 10 illustrates an example inventory management system in accordance with various embodiments.

FIG. 10 illustrates an example inventory management system 706 in accordance with various embodiments. In the example, inventory management system 706 includes product identification component 1002, sensor(s) 1004, product indexer 1006, training model 1008, sales optimizer 1010, notification component 1012, position tracker 1014, and rotator component 1016. In the example, configuration data store 908 includes data on the configuration of a shared storage in a multi-user kiosk, such as the number of carousels in the shared storage, the number of slots and trays in each carousel, the vertical positions of each carousel (e.g., which carousel is stacked on which in the column of the plurality of carousels), the rotational position of each carousel (e.g., which trays are facing which interface side of the kiosk), arrangement of each carousel and corresponding trays in a dispensing position (e.g., when carousels are rotated such that there is at least one tray facing each interface side), arrangement of each carousel and corresponding trays in a loading position (e.g., when carousels are rotated such that there is at least one tray facing a door of the kiosk for loading products), and so forth. Configuration data 908 may also include a maintenance schedule, for example, a schedule of dates listing when the storage should be replenished and/or replaced with new products (e.g., when a particular percentage of the storage becomes empty), when a new shipment of products is expected, etc. Inventory data store 906 includes data relating to the products within the kiosk, for example, a list of all products currently in the kiosk, quantity of each product, price of each product, whether a product needs to be replaced or restocked, a list of the next shipment of products that need to be loaded into the kiosk, the date of the next shipment, and so forth. Inventory data store 906 also includes the storage address of each product, for example, identified by carousel number, tray number, and slot number. Sales data store 907 stores data relating to each transaction, such as the product purchased, price, quantity, the date and time of purchase, and so forth.

Product identification component 1002 is operable to identify a product that is loaded into the shared storage of the kiosk. In an embodiment, product identification component 1002 may include a scanner, for example, for an admin to scan a barcode on a product prior to loading, and product identification component 1002 collects the product information (e.g., name of item, size, weight, packaging profile, etc.) from the barcode. In another embodiment the admin can load products directly into slots in the carousels without scanning. Product identification component 1002 may use sensor(s) 1004 installed inside the kiosk cavity, within the carousel trays and slots, etc., to identify the newly loaded product. For example, weight sensors and image sensors may collect product weight data, product weight distribution data, product packaging shape and coloring, and the like, and compare the collected data with a directory of product descriptions to identify a product loaded into each slot.

Product indexer 1006 is operable to maintain an index of storage addresses of the products. A storage address may include the carousel number, the tray number, and the slot number in which a product sits. As described, the slots can be arranged in rows and columns. In an embodiment, columns of slots across each row of a plurality of slots can rotate about a horizontal axis to vertically reposition the plurality of items stored in the column of slots. In this way, the storage address can identify a position of a slot by a row and a column, and in certain embodiments, columns and rows can rotate about appropriate axis's to position an item at a desired dispensing unit.

In an embodiment, product indexer 1006 may arrange products alphabetically, by price, by weight, etc., and assign a storage address accordingly. Product indexer 1006 may thus provide a storage address list (e.g., a list of products and their pre-assigned storage addresses) which guides an admin as to where within the carousels to load each product. When an admin loads an item into a slot, sensor(s) 1004, such as weight sensors or RFID readers, may identify the recently loaded item to verify whether the correct item has been loaded into the correct storage address. In another embodiment, products are loaded randomly (without a pre-assigned address), and after product identification component 1002 identifies the newly added product in a slot, product indexer 1006 updates the storage address to reflect the product description of the product in the slot.

Position tracker 1014 is operable to track where a product is moving within the kiosk (e.g., which kiosk sides it is rotating past) and whether the product has been dispensed. For example, position tracker 1014 monitors each slot of the carousel(s) by keeping a record of the slot's storage address and its rotational position (e.g., which kiosk side the tray containing the slot is currently behind). When a carousel rotates, every slot in the carousel has a new rotational position (except when the carousel rotates a full 360-degree revolution). After each rotation, position tracker 1014 updates the rotational position of each slot listed inventory data store 906 accordingly. When weight sensor(s) 1104 detect that the quantity of products in a slot has reduced or that the slot has become empty (e.g., due to a sale and dispensing of a product), position tracker 1014 updates the inventory data store 906 and sales data 907 accordingly. When the carousels are in a loading position (e.g., an admin is replenishing the trays of one face of the carousel) and all slots on the exposed face (e.g., at an opened storage door) have been loaded, position track 1014 instructs rotator component 1016 to rotate all carousels in the same direction so that a second face of the carousel(s) is exposed at the storage door to be accessible for loading.

Sales optimizer 1010 is operable to optimize sales of products. Training model 1008 can train sales optimizer 1010 on sales data 907. For example, training model 1008 can analyze sales data 907, such as the identity of products sold, the quantity, price, and date of purchase, to derive further sales data by calculating the frequency at which a product is sold within a time period, the frequency of refunds or exchanges, trends in the volume of a product sold, and so forth. Training model 1008 can use the sales data 907 and the derived data to train sales optimizer 1010 to recognize patterns in sales and to learn to manage and adjust the inventory to increase sales. For example, sales optimizer 1010 may recognize that product A sells frequently within a short period of time, whereas product B has rarely been sold within a long period of time. Sales optimizer 1010 can learn to modify the storage (e.g., update a list of products to be loaded the next time the kiosk is scheduled to be replenished) by increasing the quantity of product A and decreasing or removing the quantity of product B to be added to the storage during the next product loading session. Sales optimizer can also arrange for each of the plurality of carousels to dedicate a slot for product A. For example, every carousel may be updated to have at least one slot loaded with product A, so that if a plurality of users orders product A at the same time, a carousel is available to rotate and dispense product A for each user, and none of the users would need to wait for a carousel to service another user before him.

Notification component 1012 is operable to communicate inventory status and inventory details to a user. For example, notification component 1012 may send alerts to an admin, employee, maintenance professional, and the like, when there is an issue with product positioning, such as an incorrect product is loaded into a storage address that is pre-assigned for a different product, a product is misplaced or stuck within the kiosk, and the like. Notification component 1012 may also send alerts when there are changes in the quantity of a product. For example, when the quantity of a product in the carousels drops below a threshold value, when a slot becomes empty and needs to be replenished, and so forth.

Figure 11:
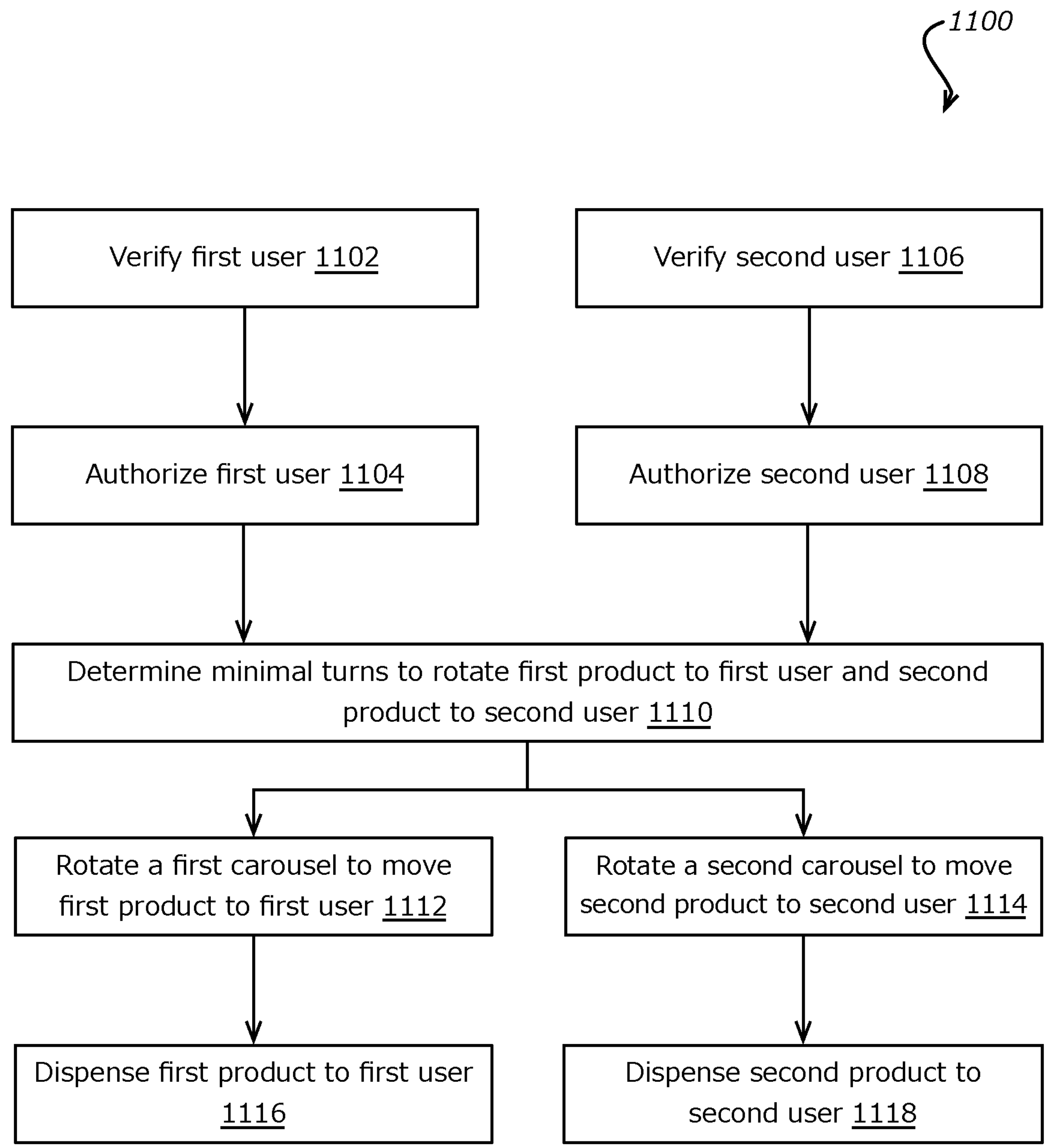
FIG. 11 illustrates an example process for dispensing products from a multi-user kiosk in accordance with various embodiments.

FIG. 11 illustrates an example process 1100 for dispensing products from a multi-user kiosk in accordance with various embodiments. In the example, when a first user approaches an interface side (e.g., a side with an input interface for user to purchase a product and with a corresponding dispenser port) of the kiosk, the process verifies 1102 (e.g., authenticate) his identity. Cameras at the kiosk may capture biometric data of the first user, for example, images of the user's facial features. The first user may be prompted (e.g., via input interface display) to upload (e.g., via a scanner coupled with the kiosk) his government issued identification (e.g., driver's license, passport, etc.). The captured biometric data is compared against the government issued identification to verify the user's identity. In another example, the process pulls data about the user's identification from government personal records and compares the records to the captured biometric data to verify the user's identity.

Once the user is verified, the process authorizes the user by determining whether the user holds access privileges to the products in the kiosk. Access privileges may range among no access to the products, ability to purchase products only, or storage access (e.g., loading, removing, adjusting products within the kiosk storage), among others. The purchase of specific products may be restricted, and may only be available for consumers who satisfy an age threshold (e.g., at least 18 years of age, 21 years of age, etc.), hold a valid prescription, hold a valid license or permit, or hold paid membership, and the like. Storage access is authorized if the user is, for example, an admin user such as an employee or manager who is allowed to open the kiosk to restock the storage, conduct repairs or system maintenance, etc. The process may prompt the user to provide his authorization documents (e.g., driver's license showing birthdate, prescription, membership card, etc.) and determine whether the user meets the requirements for purchasing the products.

At the same time or thereafter, the process verifies 1106 the identity of a second user a second interface side of the kiosk, using the techniques as described above. Once the second user is verified, the process determines whether the second user is authorized to purchase products, with the techniques as described above, and authorizes the user 1108 by determining whether the user holds access privileges to the products in the kiosk.

Once the first user has purchased a first product, the process determines 1110 the minimal number of turns to rotate product (e.g., first product) to the first user and product (e.g., second product) to the second user. For example, the process locates the first product within the kiosk. A product can have a storage address and a rotational position. In an embodiment, products are stored in a shared storage, where the shared storage is a plurality of stacked carousels that rotate about a shared vertical axis. The carousels can rotate in clockwise and counter-clockwise positions independent of each other. Each carousel has a height of at least one level of a plurality of trays that revolve with the carousel. When a carousel is in a dispensing position, each tray faces behind an interface side (e.g., a side with an input interface for user to purchase a product and with a corresponding dispenser port) of the kiosk. Each tray includes an array of slots, each slot storing a predetermined quantity of a product. Each slot can have a helical feeder coil to space out the units of each product, and the helical feeder coil may rotate about a horizontal axis to push the product out of the tray and deposit the product into a dispenser port to a user at an interface side.

In the example, the first product's storage address may include the carousel number, tray number, and slot number, in which the product is currently stored. The first product's rotational position identifies which side of the kiosk the product is currently behind (or has rotated to after a previous rotation of the carousel).

Based on the product's rotational position, the process calculates the minimal number of turns (e.g., number of kiosk sides to rotate the product past) required to move the first product from its current rotational position to the interface side (and corresponding dispenser port) at which the first user is located. A minimal rotation sequence can be derived from the calculation of the minimal turns. The minimal rotation sequence is a sequence of the minimal number of kiosk sides that the product rotates past to reach the user. Thus, the minimal rotation sequence includes the product's starting position (e.g., the product's current rotational position, prior to purchase), the sides that the product will pass by, and the product's destination position (e.g., the interface side where the user is). For example, if the first user is two sides to the left of the first product's current rotational position, the minimal rotation sequence to move the first product to the first user would be rotate the first carousel (containing the first product) two turns clockwise.

At the same time or shortly thereafter, the process also determines the minimal number of turns (and the minimal rotation sequence) to rotate the second product (e.g., located in a second carousel) to the second user, using the techniques as described above. For example, if the second user is located three sides to the right of the second product's current rotational position, the minimal rotation sequence to move the second product to the second user would be to rotate the second carousel three turns counter-clockwise.

In an embodiment, the process rotates 1112 the first carousel by the first minimal rotation sequence and rotates 1114 the second carousel by the second minimal rotation sequence at substantially the same time. In the example, the first carousel is rotated clockwise by two turns, while the second carousel is rotated counter-clockwise by three turns. When the first product arrives at the interface side of the first user, the first product is dispensed 1116 at a first dispenser port. Meanwhile, when the second product arrives at the interface side of the second user, the second product is dispensed 1118 at a second dispenser port. For example, a helical feeder coil at each product's storage address (e.g., the slot in the carousel where the product is located) may rotate about a horizontal axis to push the product forward out of the tray, causing the product to fall into a dispenser port. In another example, a vertical plate behind a product and an accordion arm (or other actuator) to slide the plate forward may be used in the product's storage address to push out and dispense the product. Thus, the first and second user receive their products at their respective dispenser ports at substantially the same time or otherwise concurrently receive their products.

Figure 12:
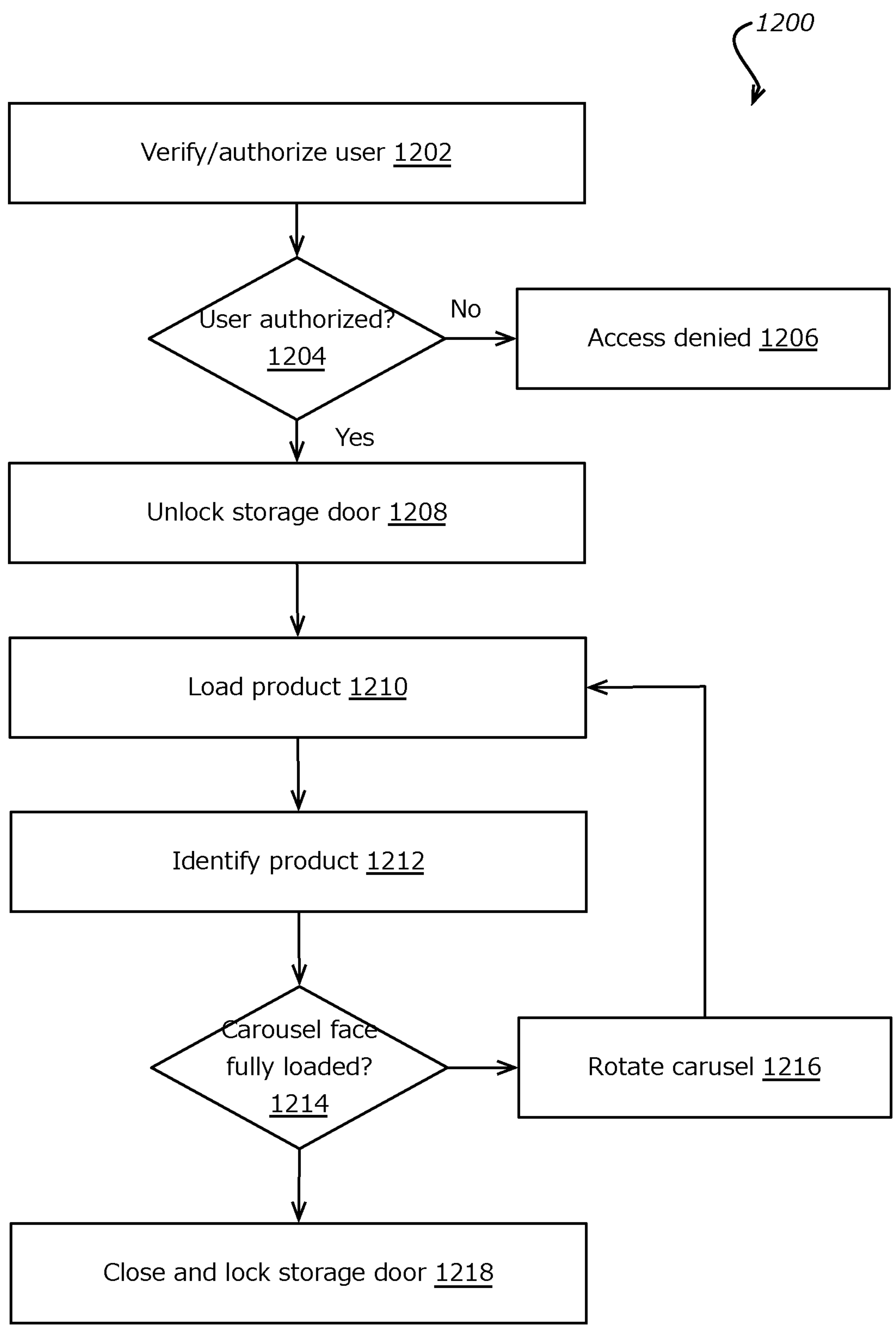
FIG. 12 illustrates an example process for loading products into a multi-user kiosk in accordance with various embodiments.

FIG. 12 illustrates an example process 1200 for loading products (also referred to as items) into a multi-user kiosk in accordance with various embodiments. In an example, when a user, such as an admin who holds authority to access and load the storage, approaches an interface side (e.g., a side with a user input interface, such as a touchscreen) of the kiosk, the process verifies 1202 (e.g., authenticates) his identity. Cameras at the kiosk may capture biometric data of the admin, for example, images of the admin's facial features. The user may be prompted (e.g., via input interface display) to upload (e.g., via a scanner coupled with the kiosk) his government issued identification (e.g., driver's license, passport, etc.). The captured biometric data is compared against the government issued identification to verify the admin's identity. In another example, the process pulls data about the admin's identification from government personal records and compares the records to the captured biometric data to verify the admin's identity.

Once the admin is verified, the process authorizes the user determines 1204 whether the admin is authorized (e.g., holds storage access privileges to the products in the kiosk). Access privileges may range among no access to the products, ability to purchase products only, or storage access (e.g., loading, removing, adjusting products within the kiosk storage), among others. To open the kiosk and load, replace, remove, or adjust product within the kiosk, a user must be authorized with storage access, such as an employee, manager, maintenance professional, etc. The process may prompt the admin to provide his authorization documents (e.g., employee badge, maintenance permit, etc.) and confirm whether his authorization documents are authentic to determine whether the admin meets the requirements for storage access. If the authorization documents are not authentic or valid, or if the admin fails to provide the authorization documents, storage access is denied 1206.

In the situation where the admin provides sufficient authorization documents, such as a valid employee badge (e.g., matches the correct name and photograph of the admin's driver's license, reflects the correct company name or employee identification number, etc.), the admin is permitted to view and/or edit restricted pages (e.g., inventory pages, system maintenance pages, etc.) on the input interface, and the process proceeds to unlock 1208 the storage door. In an embodiment, products are stored in a shared storage, where the shared storage is a plurality of stacked carousels that rotate about a shared vertical axis. The carousels can rotate in clockwise and counter-clockwise positions independent of each other. Each carousel has a height of at least one level of a plurality of trays that revolve with the carousel. Each tray includes an array of slots, each slot be able to store a predetermined quantity of a product. Each slot can have a helical feeder coil to space out the units of each product, and the helical feeder coil may rotate about a horizontal axis to push the product out of the tray and deposit the product into a dispenser port to a user (e.g., customer) at an interface side. When the carousels are rotated to a loading position, each tray faces behind a non-interface panel, at least one of which includes a storage door for accessing the shared storage. A non-interface panel is a side without an input interface and is disposed between interface sides to provide to privacy space between users. Authorizing an admin with storage access also causes the carousels to rotate into the loading position.

Unlocking and opening the storage door exposes one face (e.g., all trays facing the same kiosk side) of the plurality of carousels to be loaded 1210 with products. When a product is placed into a slot, sensors identify 1212 the product (e.g., product name, product weight, price, expiration data, etc.) and an inventory list is updated accordingly (e.g., quantity of each product, location of each product, etc.). In an embodiment, there can be a pre-configured inventory list that pre-assigns a storage address (e.g., carousel number, tray number, and slot number) for each product. When an admin loads a product into its assigned storage address, sensors (e.g., weight sensors, RFID readers, etc.) in the slot can identify the loaded item and confirm whether the correct product has been loaded. In another embodiment, the products may be identified 1212 prior to loading 1210, For example, the input interface may prompt the admin to first scan the item to identify the item and the item's preassigned storage address. The input interface may then instruct admin to load the item into the correct slot. If the slot is not facing the admin at the opened storage door, the carousel may rotate 1216 until the slot arrives at the opened storage door.

As the storage is loaded with products, the process assesses 1214 whether the exposed faces of each carousel are fully loaded with products. Sensors, such as weight sensors and image sensors (e.g., installed in each slot or in front of each tray, etc.) may detect when a slot is loaded with a product and how full the slot is (e.g., by percentage, by quantity of units of product). For example, an image sensor in a slot may identify the name of the product (e.g., by collecting and analyzing images of the product packaging, shape, and color), and a weight sensor in the slot may detect that the slot has reached a threshold weight indicating that a preconfigured quantity of that product has been placed into the slot. If sensors in all slots along the exposed face of each carousel detect the slots are filled with predetermined quantity of product, the process will rotate 1216 the carousels to expose a second face of each carousel for further product loading. When all slots in all of the carousels have been determined to be filled, the storage door will be shut and locked 1218.

Figure 13:
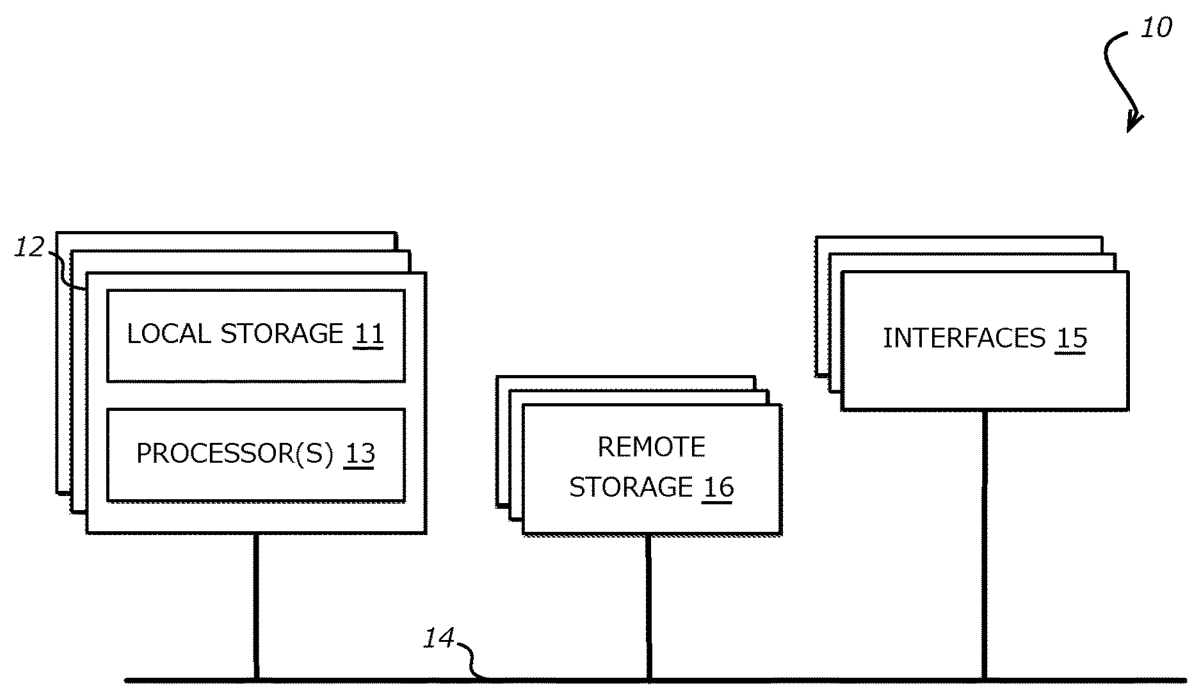
FIG. 13 illustrates components of a computing device that supports various embodiments.

Referring now to FIG. 13 there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 13 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memory storage, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
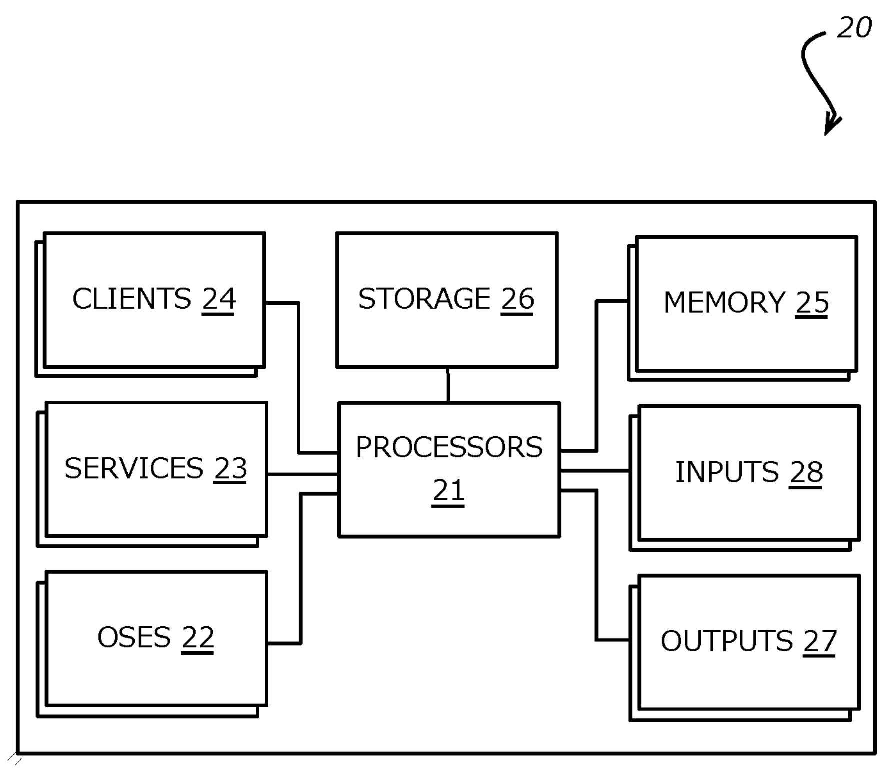
FIG. 14 illustrates an exemplary architecture of a system that supports various embodiments.

In some embodiments, systems may be implemented on a standalone computing system. Referring now to FIG. 14, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 22. Input devices 28 may be of any type suitable for receiving user input, including for example a keyboard 19, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memory storage, or electrical storage device for storage of data in digital form (such as those described above, referring to FIG. 13). Examples of storage devices 26 include flash memory, magnetic hard drive, CD-ROM, and/or the like.

Figure 15:
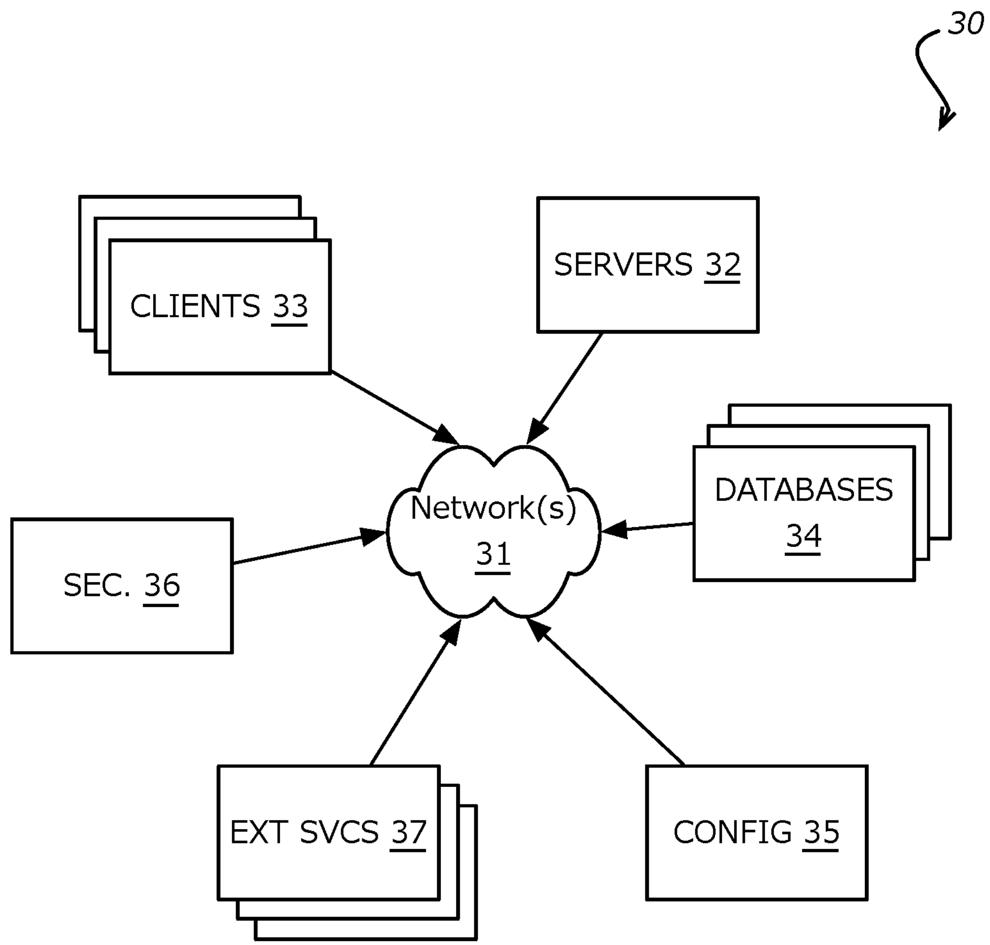
FIG. 15 illustrates another exemplary architecture of a system that supports various embodiments.

In some embodiments, systems may be implemented on a distributed computing network, such as one having any number of clients and/or servers. Referring now to FIG. 15, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 14. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 16:
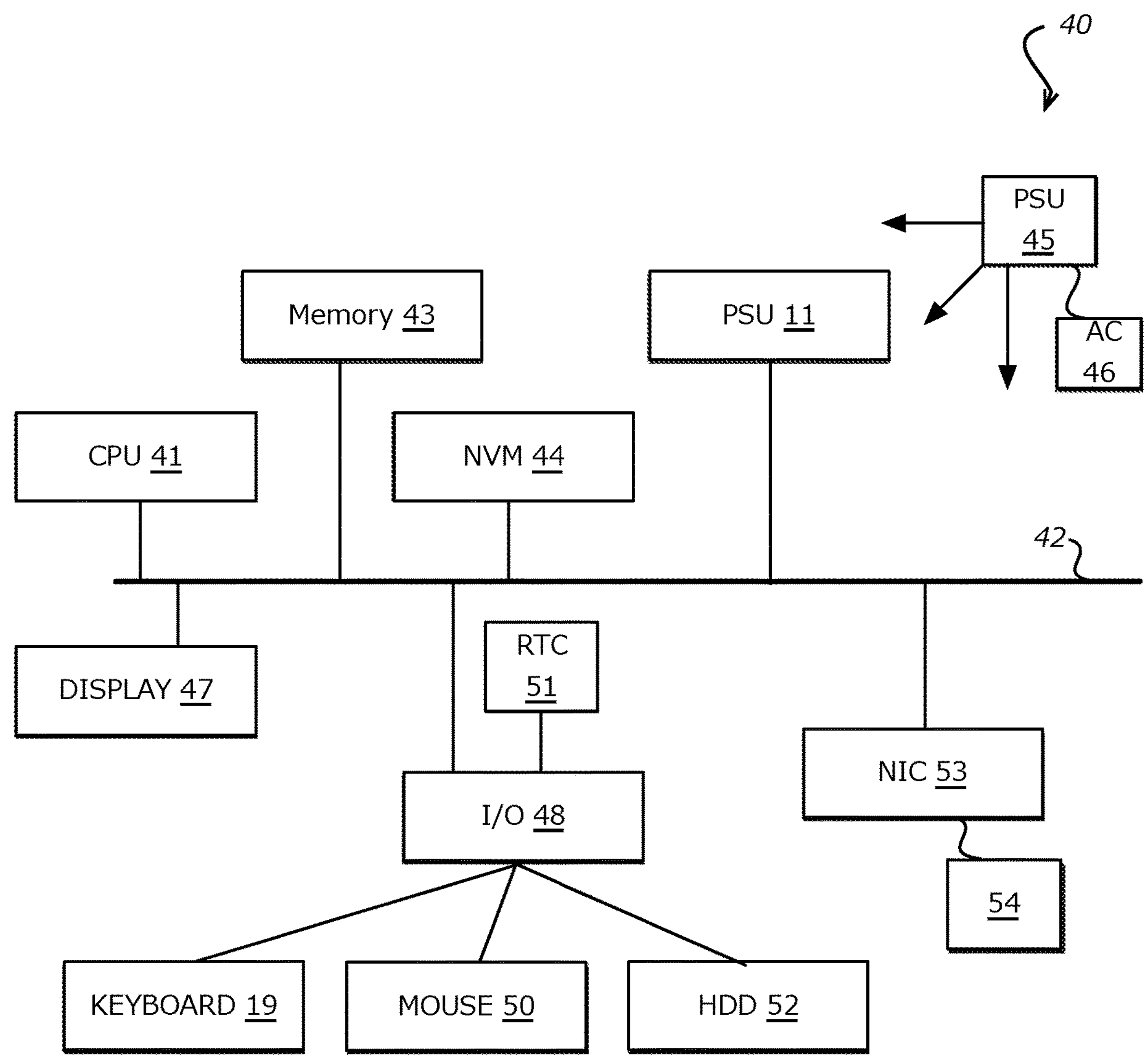
FIG. 16 illustrates components of a computer system that supports various embodiments.

FIG. 16 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and Bis false (or not present), A is false (or not present) and Bis true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. An apparatus for dispensing items, comprising:

a cabinet having a base, a ceiling, a front wall, a rear wall, and side walls, the front wall, the rear wall, and the side walls disposed in vertical planes with respect to the base and the ceiling, the base, the ceiling, the front wall, the rear wall, and the side walls defining a three-dimensional space that includes a shared plurality of carousels within the cabinet for storing a plurality of items to be dispensed, individual carousels of the shared plurality of carousels operable to rotate about a vertical axis and being stacked as a single column disposed substantially in a middle portion of the three-dimensional space;

a plurality of input interfaces disposed around the cabinet, individual input interfaces enabling purchase of at least one item from the plurality of items;

a corresponding number of dispensing units to a number of the plurality of input interfaces, individual dispensing units sharing access to the shared plurality of carousels, the plurality of input interfaces being arranged around the cabinet to allow for at least concurrent access to the plurality of items stored in the shared plurality of carousels by a plurality of customers;

a processor; and a memory for storing instructions executable by the processor, wherein the instructions, when executed by the processor, enable the apparatus to:

receive a first request from a first input interface of the plurality of input interfaces for a first item stored in a first carousel of the shared plurality of carousels and a second request from a second input interface for a second item stored in a second carousel of the shared plurality of carousels, process the first request and the second request, rotate the first carousel about the vertical axis to position and dispense the first item at a first dispensing unit associated with the first input interface, and rotate the second carousel about the vertical axis to position and dispense the second item at a second dispensing unit associated with the second input interface, the first item and the second item being dispensed at substantially a same time.

2. The apparatus of claim 1, further comprising:

at least one security camera attached to the cabinet.

3. The apparatus of claim 1, wherein the cabinet is shaped as an octagonal prism.

4. The apparatus of claim 1, wherein one of the first request or the second request is associated with biometric data.

5. The apparatus of claim 1, wherein the shared plurality of carousels comprises a number of carousels corresponding to the number of the plurality of input interfaces.

6. The apparatus of claim 1, wherein each of the shared plurality of carousels includes at least a row of a plurality of slots, each of the plurality of slots having a predetermined depth to store a predetermined quantity of each of the plurality of items.

7. The apparatus of claim 6, wherein a column of slots across each row of the plurality of slots rotates about a horizontal axis to vertically reposition the plurality of items stored in the column of slots.

8. The apparatus of claim 1, further comprising:

at least one security camera attached to the cabinet.

9. The apparatus of claim 1, further comprising:

a payment terminal for receiving at least one form of payment.

10. The apparatus of claim 1, further comprising:

a storage door to access the shared plurality of carousels.

11. The apparatus of claim 1, wherein the apparatus is configured to receive biometric data.

12. The apparatus of claim 1, wherein the instructions, when executed by the processor, further enables the apparatus to:

determine a minimum number of turns for rotating the first carousel to dispense the first item at the first dispensing unit and the second carousel to dispense the second item at the second dispensing unit.

13. The apparatus of claim 1, wherein the instructions, when executed by the processor, further enables the apparatus to:

verify that the first item is dispensed at the first dispensing unit and the second item is dispensed at the second dispensing unit.

14. The apparatus of claim 1, wherein the instructions, when executed by the processor, further enables the apparatus to:

present one of an audio or visual indication when one of the first item or the second item is dispensed.

* * * * *